(12) United States Patent
Fujita

(10) Patent No.: US 7,795,866 B2
(45) Date of Patent: *Sep. 14, 2010

(54) METHOD AND DEVICE FOR FORECASTING POLISHING END POINT

(75) Inventor: Takashi Fujita, Tokyo (JP)

(73) Assignee: Tokyo Seimitsu Co., Ltd, Tokyo (JP)

( * ) Notice: Subject to any disclaimer, the term of this patent is extended or adjusted under 35 U.S.C. 154(b) by 65 days.

This patent is subject to a terminal disclaimer.

(21) Appl. No.: 12/218,600

(22) Filed: Jul. 16, 2008

(65) Prior Publication Data

US 2009/0058409 A1 Mar. 5, 2009

(30) Foreign Application Priority Data

Sep. 3, 2007 (JP) .............................. 2007-228145

(51) Int. Cl.
*G01B 7/06* (2006.01)
*B24B 49/04* (2006.01)
*B24B 49/10* (2006.01)
*G01R 33/12* (2006.01)

(52) U.S. Cl. ............................. 324/229; 324/239; 451/8

(58) Field of Classification Search ................. 324/222, 324/226, 228, 229, 230, 239; 438/11, 13, 438/14, 17, 18, 692; 451/5, 6, 7, 8, 9, 10, 451/41; 427/9, 10

See application file for complete search history.

(56) References Cited

U.S. PATENT DOCUMENTS

| 5,559,428 | A | 9/1996 | Li et al. ..................... 324/71.5 |
| 7,046,001 | B2 | 5/2006 | Tada et al. ................... 324/230 |
| 2002/0047705 | A1* | 4/2002 | Tada et al. ................... 324/230 |
| 2006/0214657 | A1 | 9/2006 | Tada et al. ................... 324/230 |
| 2007/0103150 | A1 | 5/2007 | Tada et al. ................... 324/229 |
| 2008/0290865 | A1* | 11/2008 | Fujita et al. .................. 324/230 |
| 2009/0061733 | A1* | 3/2009 | Fujita et al. ..................... 451/5 |
| 2009/0256558 | A1* | 10/2009 | Fujita et al. ................. 324/230 |

* cited by examiner

*Primary Examiner*—Kenneth J Whittington
(74) *Attorney, Agent, or Firm*—Fattibene and Fattibene; Paul A. Fattibene

(57) ABSTRACT

A method for forecasting a polishing end time or point, wherein an inductor 36 in a sensor is placed adjacent to the conductive film 28. The magnetic flux formed by the inductor 36 is monitored, and a change of magnetic flux induced in the conductive film 28 is detected. Based on the skin effect of the material of the conductive film 28 as a factor, a process is used in which an eddy current formed with the decrease of the film thickness by polishing increases and a process in which the eddy current formed with the decrease of the film thickness substantially decreases when the polishing is progressed. Based on the characteristic change of the magnetic flux induced in the conductive film 28, the polishing end point is forecasted, and at the same time, the magnetic flux induced in the conductive film 28 is alleviated or turned off.

8 Claims, 17 Drawing Sheets

NUMBER OF WINDINGS: 23 OR THE LIKE

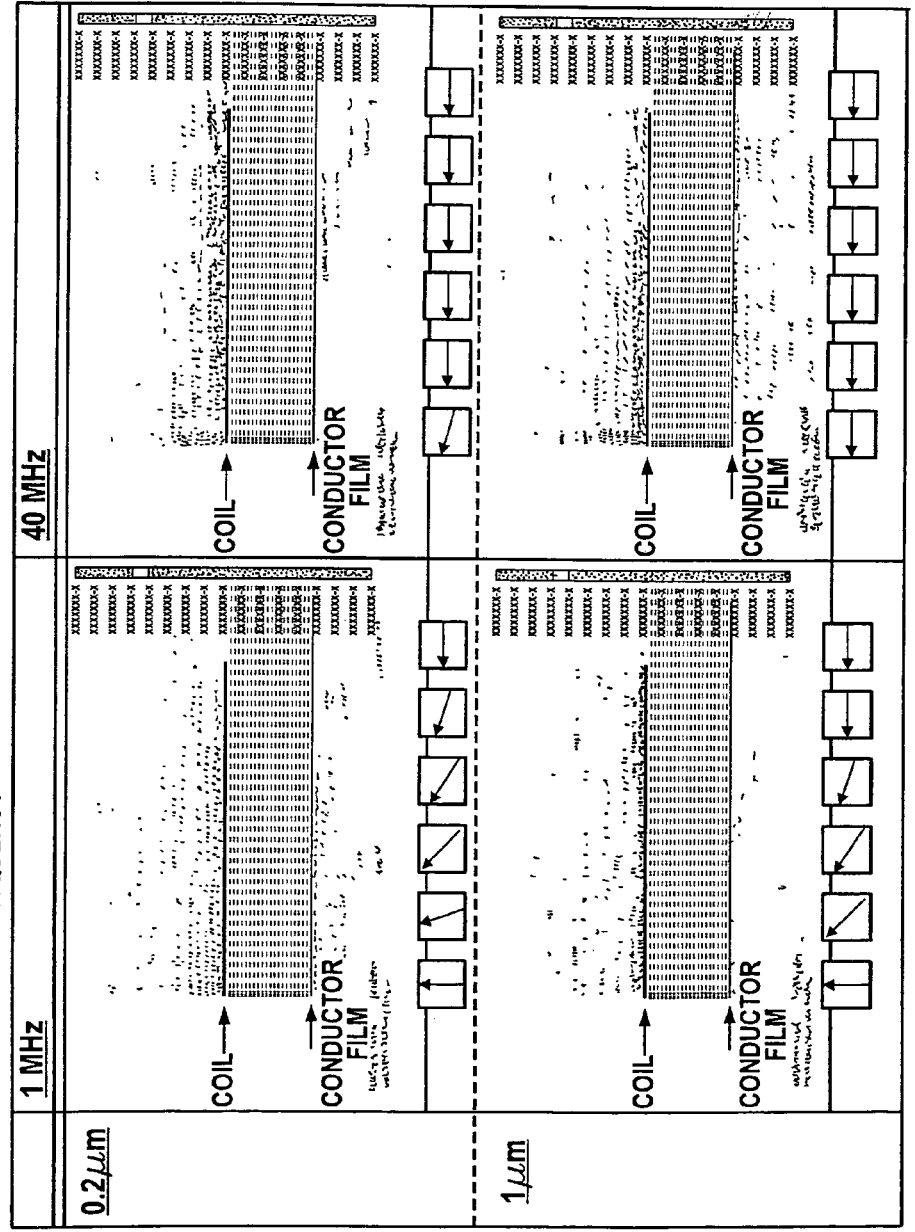

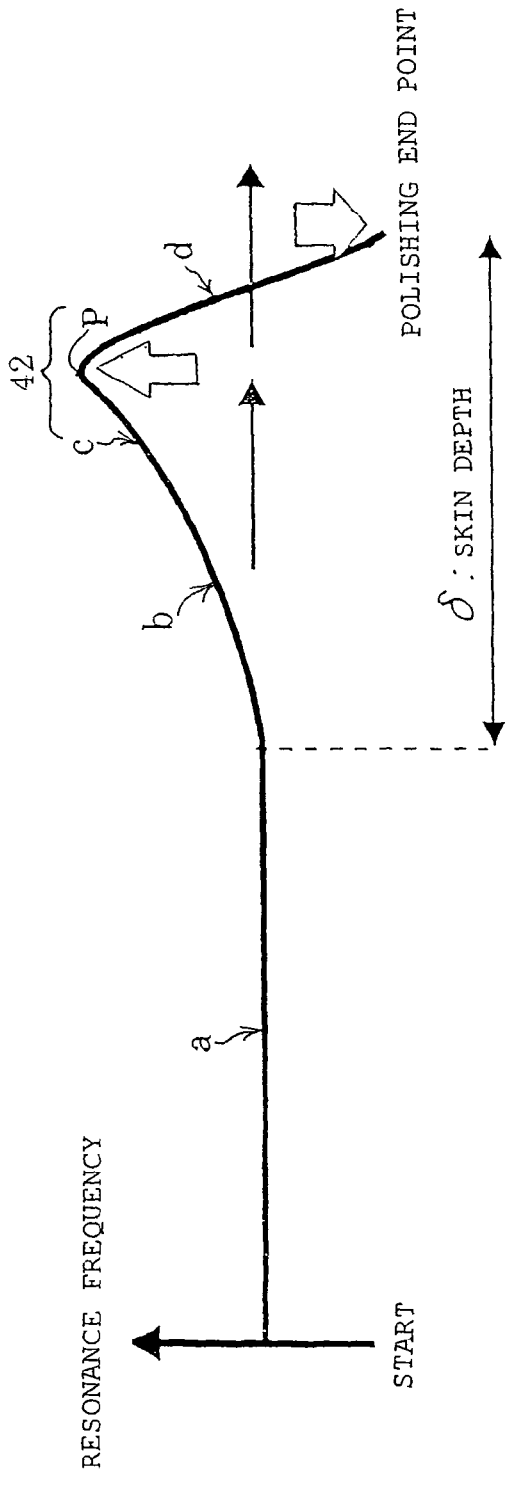

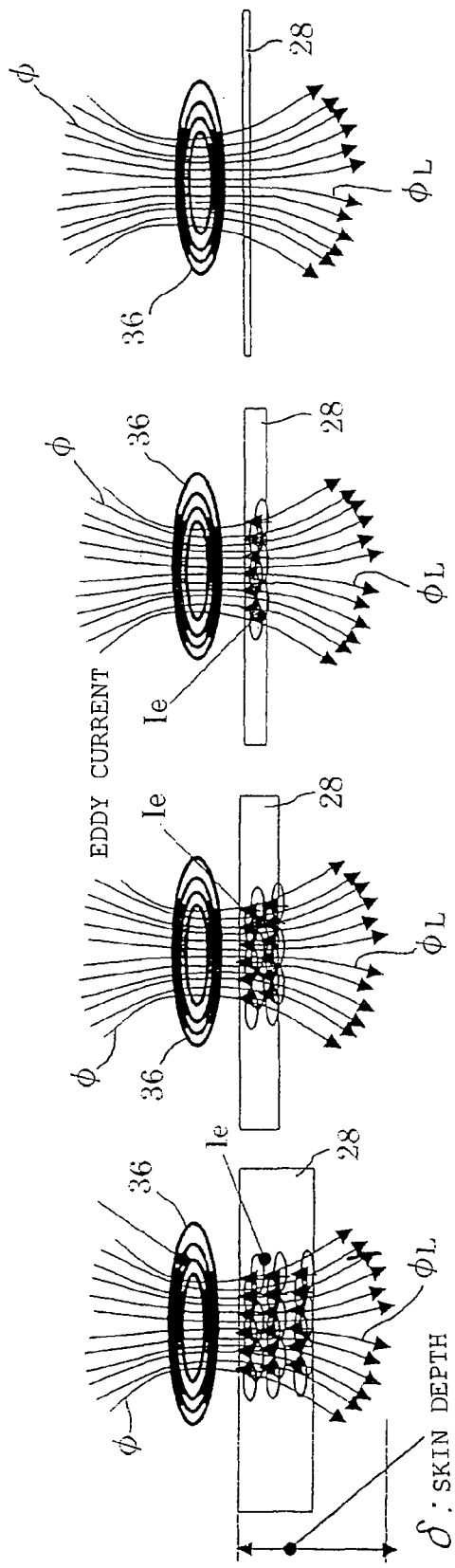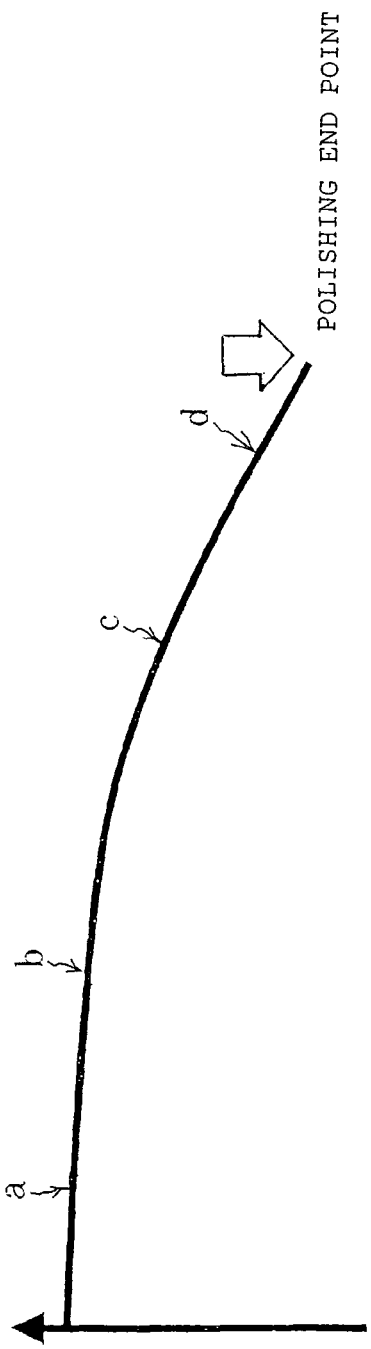
FIG.12(a) FIG.12(b) FIG.12(c) FIG.12(d)
FIG.12(e)

METHOD AND DEVICE FOR FORECASTING POLISHING END POINT

BACKGROUND OF THE INVENTION

1. Field of the Invention

The present invention relates to a method and device for forecasting a polishing end point, and in particular, it relates to a method for forecasting a polishing end point capable of accurately forecasting and detecting a polishing end point by suppressing a joule heat loss to the minimum due to the excess current without exerting strong magnetic fluxes over an element and the like formed on a device wafer by a Chemical Mechanical Polishing (CMP) and a device thereof.

2. Description of the Related Art

There has been known a process in which, for example, an oxide film is formed on a semiconductor wafer, and the oxide film is subjected to lithography and etching, thereby to form a groove pattern corresponding to a wiring pattern, and on this, a conductive film made of Cu and the like for filling up the groove pattern is deposited, and from among this conductive film, unnecessary portion other than the filled up portion such as the groove pattern and a through hole portion and the like are removed by the chemical mechanical polishing, thereby to form a wiring pattern. In the formation of this wiring pattern, it is extremely important to put a stop to the process by accurately detecting a polishing end point when the unnecessary conductive film is removed with an appropriate thickness. When the polishing of the conductive film is excessive, a wiring resistance is increased, and when the polishing is insufficient, an insulation fault of the wiring is invited.

As the technology in this connection, for example, the following method has been known in which a change of the film thickness is monitored on the spot. This conventional technology is a method for monitoring the change of the conductive film thickness on the spot in the method for removing the conductive film from above the substrate main body (semiconductor wafer) by the chemical mechanical polishing. This method disposes a sensor including a serial or a parallel resonance circuit of an inductor and a capacitor made of a coil wound around a ferrite/pot type core for shaping in order to bring about directivity in the magnetic field in the vicinity of the conductive film, and applies a sweep output made of the frequencies of 20 Hz to 40.1 MHz from an excitation signal source to the sensor through impedance means for operation point setting. As a result, when the sensor is excited, an oscillation current flows into the coil, thereby to generate an alternating magnetic field. This alternating magnetic field subsequently induces an eddy current in the conductive film. When the eddy current is induced in the conductive film, two effects are generated. In the first place, the conductive film works as a loss resistance, and its effect is a resistance load for the sensor circuit, and this decreases amplitude of the resonance signal, and decreases the resonance frequency. In the second place, when the thickness of the conductive film decreases, an effect is generated as if a metallic rod were taken out from the coil of the inductor, thereby causing a change of inductance and a frequency shift. By monitoring a change of the frequency shift associated with a sensor resonance peak caused by the change of the thickness of the conductive film in this manner, the change of the thickness of the conductive film is continuously detected (for example, see Patent Document 1).

As another conventional technology, for example, the following eddy current sensor has been known. The literature showing this conventional technology describes as follows: quote "In general, the eddy current sensor forms an eddy current in the conductive film provided on the surface of a semiconductor substrate, and by this eddy current, the measurement of the film thickness is indirectly performed. Therefore, there arises a problem that it is difficult to perform accurate film thickness detection, whereas this conventional technology provides an eddy current sensor capable of accurately detecting the film thickness and the like from an extremely thin film to a relatively thick conductive film formed in the semiconductor substrate" unquote. To achieve this object, the conventional technology includes a sensor coil (eddy current sensor) disposed in the vicinity of a conductive film or a substrate formed with the conductive film; an alternative signal source forming an eddy current in the conductive film by feeding an alternative signal of a constant frequency to the sensor coil at the frequencies of approximately 8 to 32 MHz; and a detection circuit for measuring a reactance component and a resistance component including the conductive film, and the sensor coil includes a oscillation coil connected to the signal source, a detection coil disposed at the conductive film side of the coil, and a balance coil disposed opposite to the conductive film side of the oscillation coil, and the detection and the balance coil are connected so as to be mutually in a reversed phase. From the resistance component and the reactance component detected by the detection circuit, synthetic impedance is outputted, and from the change of the impedance, the change of the film thickness of the conductive film is detected in a wide range and approximately as a linear relation (see Patent Document 2).

Further, as another conventional technology, for example, the following eddy current sensor has been known. This conventional technology, similarly to the previous conventional technology, describes in the paragraph [0008] in the Patent Publication showing this conventional technology that the magnetic flux formed by the sensor coil penetrates the conductive film on a substrate disposed on the whole sensor coil surface and alternatively changes, so that an eddy current is generated in the conductive film, and that eddy current flows into the conductive film, thereby to cause an eddy current loss, and this is equivalent to the reduction of the reactance component of the impedance of the sensor coil when seen from the equivalent circuit. Further, the paragraph [0009] describes that when the conductive film becomes gradually thin accompanied with the progress of the polishing by observing the change of the oscillation frequency of the oscillation circuit, the oscillation frequency decreases as a result, and becomes a self-oscillation frequency of a tank circuit in which the conductive film completely disappears by the polishing, and after that, the oscillation frequency becomes approximately constant. Therefore, by detecting this point, it is possible to detect the end point of the conductive film by the chemical mechanical polishing. Further, the paragraph [0025] describes that, as shown in FIG. 2, when the polishing of the conductive film progresses, accompanied with this, the eddy current changes, and the equivalent resistance of the sensor coil changes. Consequently, since the oscillation frequency of the oscillation circuit changes, this oscillation signal is divided by a frequency dividing circuit or reduced by a subtractor, so that a signal corresponding to the size of the frequency of a detected width is displayed in a monitor. As a result, the transition of the frequency locus as shown in FIG. 2 can be obtained (see, for example, Patent Document 3).

Further, as another conventional technology, for example, the following eddy current sensor has been known. This conventional technology, in the first aspect of the invention, is an eddy current sensor including a sensor coil disposed in the vicinity of the substrate formed with a conductive film; a signal source forming the eddy current in the conductive film by feeding an alternative signal to the sensor coil, and a detection circuit for detecting the eddy current formed in the conductive film as an impedance seen from the sensor coil, and the sensor coil is an eddy current sensor stored inside a storing member formed by a high magnetic permeability material. Further, the seventh aspect of the invention discloses an eddy current senor including a sensor coil disposed in the vicinity of the substrate formed with a conductive film, a signal source forming an eddy current in the conductive film by feeding an alternative signal to the sensor coil, and a detection circuit for detecting the eddy current formed in the conductive film as an impedance seen from the sensor coil, wherein a resistance component and a reactance component of the impedance are displayed on an orthogonal coordinate axis and a film thickness of the conductive film is detected from an angle made by a straight line connecting the coordinate of the designated center point of the coordinate of the impedance (see, for example, Patent Document 4).

[Patent Document 1] Japanese Patent No. 2878178
[Patent Document 2] Japanese Patent No. 3587822
[Patent Document 3] Japanese Patent Application Laid-Open No. 2003-21501
[Patent Document 4] Japanese Patent Application Laid-Open No. 2005-121616

SUMMARY OF THE INVENTION

The conventional technology disclosed in Patent Document 1 is provided with a serial or a parallel resonance circuit with an inductor and a capacitor made of a coil wound around a ferrite/pot type core to bring about directivity in the magnetic field of a sensor. In the polishing initial period, a sweep output made from the frequencies of 20 Hz to 40.1 MHz is applied to the sensor, and by an alternating magnetic field having directivity generated from the coil, a leakage magnetic flux penetrating the conductive film is generated, so that a large eddy current corresponding to the film thickness of the conductive film is induced from the early period of the polishing. To induce a large eddy current corresponding to the film thickness of the conductive film, it is necessary to form a large alternating magnetic field, that is, a large magnetic flux to the extent of penetrating the conductive film, and a monitoring of the change of the thickness of the conductive film is performed by using the eddy current induced inside the conductive film from the early period to the end period of the polishing. Hence, during the monitoring of the change of the film thickness, it is necessary to allow the magnetic flux to penetrate into the thickness direction of the conductive film. This is evident in view of the fact that the figure of the Patent Publication according to the Patent Document 1 illustrates the magnetic flux lines penetrating the conductive film in the parts of all the conductive films.

It is common to provide immaculate Cu films (conductive films) on the upper most layer of the wafer surface in the polishing initial period. To induce the eddy current on all of these immaculate Cu films, an extremely large leakage magnetic flux is required. However, though such a leakage magnetic flux induces the eddy current, they are consumed by transforming into the Joule heat in the form of the eddy current loss in the course of time. Since this Joule heat loss is small in volume resistance, heat generation is small, but in the parts already wired of the interior, the wiring cross-sectional area is small and the volume resistance is small with respect to the immaculate Cu films, so that a large eddy current is induced by the penetrating magnetic flux with a result that a large Joule heat loss is locally generated. This sometimes leads to a problem that a part of the wiring is melt and disconnected. The wiring is put into an induced heating state, and causes a phenomenon in which the heat is filled inside. Particularly, in the case of the Cu wiring and the like, when Cu is heated, Cu is diffused in a barrier film such as Ta, and in some cases, there is a possibility that Cu ends up diffusing by bursting through the barrier film.

Further, when several layers of the wirings are placed on the surface part of the wafer, there is not only worry about the Cu film on the surface layer, but also there is a possibility that a wiring part of the interior having already completed the processing is locally warmed up so as to be diffused into surroundings, and dopants forming a p-type and n-type inside the semiconductor substrate are further diffused, so that the characteristics of the element inside the substrate are sometimes changed. Further, even when heat is not generated, in the case where an excessively eddy current flows into a micro wiring, an electromigration is sometimes induced, thereby to cause a disconnection.

Further, a damage given to the element by an invading magnetic field can be construed as follows. That is, in the method shown in Patent Document 1, the eddy current is formed in the part of the conductive film (Cu film) of the surface by the invaded magnetic field, and by that eddy current, a repulsive magnetic field is generated. In the polishing initial period, by the conductive film covering the surface, the damage to the element for preventing the invasion of the magnetic field into the inside element is small. Energy-wise, it is consumed inside the conductive film as the Joule heat loss by the eddy current generated by the conductive film covering the surface. Hence, in the early status of the polishing, the inside element is protected in some degrees from the effect of the magnetic field by the conductive film of the surface. However, when the polishing progresses and a film covering the conductive film of the surface is removed, the magnetic field does not disappear, but invades inside the element as it is without being reduced. In the polishing initial period, while the energy of the magnetic field is consumed as the Joule heat loss inside the conductive film of the surface, when the conductive film of the surface is removed by the polishing, the energy consumed by the Joule heat loss is borne by the element side as it is. When there is no conductive film to generate the eddy current inside the element, the magnetic field bursts out the inside of the element and is consumed in the space of the outside, but when the conductive film of some size exists, the eddy current is intensively generated, thereby to cause a disconnection. Although this is caused in some degrees by the structure of the element, in general, when the magnetic field having high directivity to such extent of allowing an eddy current amount generated by the whole conductive film thick in surface to invade inside the element, the eddy current ends up being generated from place to place, thereby causing an adverse effect. This is self-explanatory. Further, in this method, the magnetic field is introduced into the conductive film, and by that magnetic field, the eddy current is generated. The change of that eddy current amount is monitored, and the film thickness is estimated. In this case, to estimate the film thickness, it is necessary to continuously generate the eddy current. The reason why is because unless the eddy current is generated, neither the circuit system is operated, nor the changed film thickness is estimated. Further, with respect to the forecasting of the completion of the polishing, unless the removed film thickness is estimated, the forecasting of neither the end point nor the end point vicinity is possible. Hence, to detect an end point and forecast an end point as well as to monitor a film thickness, it is indispensable to form the eddy current continuously.

Further, for example, when the polishing condition is changed and the processing is performed at the time of reaching some predetermined remaining amount of the film in the vicinity of the end point of the polishing, it is difficult to determine whether or not it is the predetermined remaining amount of the film. This is because although it is possible to assume from the portion changed from the film thickness of the initial period, when the film thickness of the initial period is fluctuated, the estimation of the predetermined remaining amount of the film is also fluctuated. With respect to the determination as to the end point vicinity of the polishing, when a gap between the sensor and the conductive film is minutely changed by the vibration of the polishing, a floating capacity of the whole sensor circuit system is changed, so that the whole resonance frequency is shifted. Hence, granted that a threshold value is set when the sensor circuit system becomes certain set resonance frequency so as to make a setting to determine the polishing end point, if the resonance frequency is totally shifted, the determination as to whether or not the polishing end point by the setting of the threshold value becomes difficult. Thus in this conventional technology, in the resonance frequency monotonously and continuously increasing or decreasing, even if the threshold value is set to some value, the gap between the sensor and the conductive film is minutely changed and a dielectric substance of some kind or another is intervened between thereof, so that there frequently exist the cases where its waveform itself vertically moves in parallel, and as a result, there frequently exist the cases where the threshold value set in advance does not make any sense.

In the conventional technology disclosed in Patent Document 2, first, as the background of the technology, the paragraph [0004] in the Patent Publication showing this conventional technology raises the questions about the difficulty of accurately detecting the film thickness since the eddy current sensor generally forms an eddy current in the conductive film provided on the surface of the semiconductor substrate, and performs the indirect measurement of the film thickness by the eddy current. Further, the paragraph [0005] describes that an object of the invention is to provide an eddy current sensor capable of accurately performing the detection of the film thickness and the like from the extremely thin film to the relatively thick conductive film formed on the semiconductor substrate. In the case of this conventional technology, for example, while the eddy current is generated to measure the film thickness by the relatively thick film, when the thick film is polished and reduced so as to reduce the eddy current, in the reduced portion of the eddy current, the energy of the magnetic field is not simply consumed in the conductive film on the surface, but enters inside the element present under the conductive film as it is. That is, primarily as against the energy of the magnetic field consumed by the conductive film, the exposure of the excessive energy of the magnetic field inside the element is permitted as the conductive film is removed.

In contrast to this, in the present invention, the measurement of the film thickness is not performed by positively inducing the eddy current inside the film. By utilizing a skin effect of the conductive film for the magnetic field, the invasion of the magnetic field into the conductive film is discouraged as much as possible, and an eddy current generated by the leakage of the part of the magnetic field from the conductive film in the film thickness removal vicinity is detected, and from its changed form, the endpoint is forecasted. Further, by the eddy current generated in the conductive film of the surface, the magnetic field energy consumed by the part of the element present under the conductive film decreases as much as possible. Immediately before the conductive film is removed, in the course of the reduction of the total eddy current accompanied with the reduction of the film thickness, since the magnetic field energy affects the internal element, an attempt is made to reduce the magnetic field energy. In this manner, while the invasion into the element of the magnetic field is prevented as much as possible, the time point of removing the film in that state is accurately forecasted Further, according to this conventional technology, as its configuration, the sensor coil includes an oscillation coil connected to a signal source, a detection coil disposed at the conductive film side of the coil, and a balance coil disposed opposite to the conductive film side of the oscillation coil, and a series circuit connecting the detection coil and the balance coil so as to be mutually in a reversed phase is connected with a variable resistor, and when the conductive film as a detection target is not present, the output of the series circuit is adjustable to become zero, and a synthetic impedance is outputted from the resistance component and the reactance component detected by the detection circuit, and from the change of the synthetic impedance, the change of the film thickness of the conductive film is detected in a wide range and as an approximately linear relation.

However, in the present invention, as an inductance, three coils such as the oscillation coil, the detection coil, and the balance coil are not required. Further, it is not that these coils are stacked three-dimensionally in a multi-stage, and its magnetic flux change is monitored. The coil serving as an inductor is one only, and is configured to be two-dimensional. Further, in this conventional technology, though the series circuit in which the detection coil and the balance coil are connected so as to be mutually in a reversed phase is connected with a variable resistor, in the present invention, a resistor such as the variable resistor is not nipped. In the present invention, the coil forms an oscillation circuit of the Colpits type, and connects capacity to the inductor in parallel.

Further, according to this conventional technology, the synthetic impedance is outputted from the resistance component and the reactance component, and this synthetic impedance forms an approximately linear relation in a wide range for the film thickness change, and obtains the film thickness from the linearly changing relation.

However, the present invention does not aim at the measurement of the film thickness in the wide range. Based on the characteristic change immediately before the polishing end point, it aims at accurately forecasting the polishing endpoint. Further, the change of the characteristic waveform immediately before the polishing end point does not represent an approximately linear change. A precipitous inflection point is given by the influence of the skin effect, and based on the inflection point and the characteristic points such as a precipitous rate of change and the like before and after that, the polishing end point is accurately forecasted.

Further, according to this conventional technology, the paragraph [0027] shows a change of the resistance portion for the change of the film thickness of the conductive film in FIG. 7B. The relation of the change of the film thickness to the change of the resistance portion changes as illustrated by the resistance portion R in proportion as the film thickness changes from thick to thin. That is, in a region (a) of the extremely thin film thickness, the output of the resistance portion R sharply linearly changes, and when the region becomes a region (b) having some thickness, the change of the resistance portion R is saturated, and further, in a region (c) in which the film thickness becomes thick, the output of the resistance portion R decreases. Here, in the case of a copper film, the point (a) shows an approximately 1000 Å, the point (b) shows Approximately 2000 to 3000 Å, and the point (c) shows approximately 5000 Å.

However, a behavior of the resistance portion of the conductive film becoming large, and after that, becoming small depending on the film thickness shows a locus of the circle, and arises from a balance of phases in the balance between the resistance component and the reactance component. Such a behavior is not based on the skin effect as in the case of the present invention, whose behavior is quite different.

In the present invention, a precipitous inflection point as shown in the figure described later is generated by a reduction based on a series of the skin effects from a process in which the magnetic flux does not invade inside the conductive film due to the skin effect to a process in which a part of the magnetic flux leaks accompanied with the reduction of the film thickness, and after that, when the magnetic flux penetrates in some degrees, the eddy current decreases according to the volume of the film.

That precipitous inflection point does not simply affect the frequency only. As shown in a case example where a simulation has been conducted by an inductor distance of $1/1000$ and an inductor diameter of $1/1000$ which are to be shown later, there are often the cases where, even when it is the same frequency, depending on a diameter of the inductor and a distance between the inductor and the conductive film, the directivity of the magnetic field changes, and an invading behavior of the magnetic field into the conductive film sharply changes. There is also a case where, while some inductance diameter and inductance distance are given an inflection point based on the skin effect in a process in which the film thickness at the polishing time decreases, the inductance size of $1/1000$ and the inductance distance of $1/1000$ are not given the inflection point based on the skin effect in a process in which the film thickness at the polishing time decreases. This clearly shows that, not only in the setting of the frequency at that time but also the shape, the distance, and the like of the inductor, a directivity of the magnetic field changes, and the invading characteristic of the magnetic field into the conductive film changes by the skin effect, and a state of the inflection point changes.

In the present invention, a phenomenal changing process from a state in which the magnetic field does not invade into such a conductive film to a state in which the magnetic field invades the conductive film is formed in a process in which the film thickness is polished and reduced, and by using that state of the change, a point at which the conductive film would be accurately removed is forecasted. Hence, a change of the resistance component based on the skin effect and a change of the resistance component determined from the phase relation between the resistance component and the reactance component as described in the Patent Publication belong to a totally different category.

Further, in this conventional technology in which the film thickness of the conductive film is monitored by using the eddy current from the polishing initial period to the polishing end period, it is necessary to raise the magnetic flux s strong enough to the extent of infiltrating into the film in order to bring about the eddy current inside the film, and the shape of the inductor is three-dimensional to allow the magnetic flux to carry directivity. Hence, in general, the mounting of the sensor to the polishing apparatus and the like causes the following problem. The current flowing into the coil increases, much power is consumed, and a power unit becomes also large-sized. The magnetic flux leaks into surroundings, and is liable to cause noise. A process of winding a conductive wire into a coil shape and the like is required, and this leads to high cost of production.

In the conventional technology including the eddy current sensor disclosed in Patent Document 3, first, with respect to hard ware of the sensor portion used in this conventional technology, the sensor coil is configured based on the assumption that it penetrates the conductive film. Consequently, in the hard ware which generates only the magnetic field to the extent of not penetrating the conductive film, no eddy current is formed, and no object is achieved. Further, the reduction of the conductive film by the polishing monotonously decreases an area, in which the eddy current is formed, and for this reason, a behavior in which an oscillation frequency is monotonously reduced is disclosed, and the time when the oscillation frequency becomes approximately constant is taken as an end point, and this portion is detected. That is, in an algorism of software used in this conventional technology, a change of the oscillation frequency takes a change of becoming approximately constant from the reduction as a change of the oscillation frequency, and for example, when this oscillation frequency makes a change to have an inflection point, this cannot be detected at all in this algorism. Further, as shown in FIG. 2, from the polishing initial period, the magnetic flux is in a state in which it penetrates the conductive film and generates the eddy current at any time. Here, the eddy current sensor positively generates the eddy current all time, and generally takes a method of recalculating the change of the eddy current into the change of film thickness as an eddy current sensor.

Further, according to this conventional technology, first, as its background, the paragraph [0012] in the Patent Publication showing this conventional technology raises the question as follows. The oscillation frequency used for the eddy current sensor is approximately 7 MHz, and is relatively small, and therefore, when the conductive film of the polishing target is sufficiently thick, a large eddy current loss can be detected, whereas in proportion as the polishing of the conductive film progresses and the film thickness becomes extremely thin, a magnitude of the eddy current loss becomes small, and in this case, for example, the detection of the film thickness of approximately below 1000 Å becomes difficult. That is, since the conventional eddy current sensor is relatively low in oscillation frequency, its accuracy is not sufficient enough for the detection of the end point of the polishing of the polishing apparatus for which the film thickness detection accuracy of an order of Angstrom coefficient is required.

This conventional technology discloses a method, in which regardless of a thick film thickness or a thin film thickness, the magnetic field is allowed to invade into the film in the same manner, and by the size of the eddy current by the magnetic field, the film thickness is simply monitored.

However, in the present invention, it does not come into question even when the conductive film is relatively thick. On the contrary, when the conductive film is thick, the magnetic field does not invade into the conductive film by the skin effect, and consequently, no detection of a large eddy current is required. Further, when the film thickness decreases up to approximately 1000 Å, even if the magnetic field has no directivity, it partially penetrates the conductive film, and decreases the film thickness, and at the same time, forms an eddy current so as to generate a repulsive magnetic field. This allows the repulsive magnetic field to be accurately detected. The characteristic behavior based on the skin effect in the vicinity immediately before the conductive film is removed is taken in a close-up and detected, thereby to accurately forecast the polishing endpoint, and it is not the object of the invention to measure the film thickness even when it is a thick film thickness.

Further, in this conventional technology, the paragraph [0028] discloses that the oscillation frequency signal of the eddy current sensor is taken as the time gradient of the frequency, that is, a temporal differentiation signal of the oscillation frequency is calculated, and by this characteristic point, the polishing endpoint can be determined. FIG. 5A shows a transitive locus of the time t of the oscillation frequency itself, and FIG. 5B shows a transitive locus of this differential value. In this manner, the behavior of the oscillation frequency shows a behavior monotonously reduced, and at the lowest point of the monotonous decreasing point of this oscillation frequency, the determination of the end point of the polishing is performed. Further, the end point is determined by finding out a point of change in the monotonous reduction by differentiating its waveform.

However, in the present invention, such a behavior of the oscillation frequency is decidedly different. That is, in the present invention, in the reducing process of the film thickness by the polishing, by the skin effect of the conductive film, the oscillation frequency rises once together with the decrease of the film thickness, and after that, it falls, so that one peak is provided just before the end point. This behavior is generated from the process in which the magnetic field does not invades into the conductive film by the skin effect to the process in which the magnetic field, and is decidedly different from the behavior shown in this conventional technology. Further, the detection method detects a rising and falling inflection point and the characteristic portion in the vicinity of the inflection point, and accurately forecasts the polishing end point.

Further, in this conventional technology, aspiral sensor coil is disposed orthogonal to the substrate. In contrast to this, in the coil of the present invention, one flat inductor is disposed in the form of being parallel with the substrate, and this is decidedly different even in the term of the configuration of the device. Further, in this conventional technology, as shown in the paragraph [0032], similarly as described above, a behavior is shown in which the resistance component increase once in proportion as the film thickness decreases, and after that, it decreases. However, similarly as described above, this is also not the behavior appearing from the skin effect. This is the inflection point generated by the balance between the resistance component and the reactance component in the phase difference in the circuit shown in the figure.

That is, the inflection point in the present invention is totally different from such an inflection point. As described earlier, by the size and the shape of the coil, and the distance up to the coil from the conductive film, the inflection point sharply changes, and depending on the setting, there are often the cases where, even if in the high frequency band, the characteristic behavior by the skin effect is not found. In the present invention, the electric conductivity, the magnetic permeability, the frequency, an inductor shape of the conductive film, and moreover, the distance between the inductor and the conductive film and the like are appropriately set, and in the process of reducing the film thickness by the polishing, the oscillation frequency is put into a state of carrying the inflection point by the skin effect, and based on the characteristic portion of the waveform, the polishing end point is accurately forecasted.

In the conventional technology made of the eddy current sensor disclosed in Patent Document 4, it is apparent that this conventional technology, similarly to the conventional technology disclosed in each of the above described Patent Documents, is totally different from the waveform in which the inflection point appears due to the use of the skin effect.

Hence, without exercising the strong magnetic flux up to the element and micro wiring and the like formed in the device wafer downward the conductive film, the generation of the eddy current induced by electromagnetic induction is suppressed as a result, and the Joule heat loss by the eddy current is suppressed to the minimum, and at the same time, an eddy current amount induced by the eddy current induced by a change of the gap between the sensor and the conductive film as well as an intervening normal state of dielectric substance such as slurry and the like is shifted as a whole, so that the setting of the threshold value is sharply changed and becomes difficult to be detected is prevented, and even when the magnetic field is minute to the extent of not penetrating the device wafer, it can be sufficiently and accurately detected, and when the technological problem to be solved for accurately forecasting and detecting the polishing end point occurs, the present invention aims at solving this problem.

The present invention has been made to achieve the above described object, and the invention according to the first aspect of the invention is a method for forecasting and detecting a polishing end point in a case when a predetermined conductive film is appropriately removed by polishing the conductive film, and provides a method for forecasting a polishing end point, wherein an inductor in an inductor type sensor is placed adjacent to the predetermined conductor film, and by the magnetic flux formed by the inductor, a change of magnetic flux induced in the predetermined conductive film is monitored, and based on a change of the magnetic flux by a skin effect decided by the film thickness during the polishing with the material of the predetermined conductive film as a factor, a characteristic change is detected, and from the characteristic change, the polishing end point is forecasted.

According to this configuration, the inductor is driven by the high frequency, and from the inductor, a magnetic flux changing corresponding to the cycle of the high frequency is generated. Until the predetermined conductive film reaches a film thickness corresponding to the skin depth by the polishing, the magnetic flux induced in the predetermined conductive film passes through a region of the skin depth along the film surface. When the polishing progresses and the predetermined conductive film becomes equal to the skin depth or the film thickness in its vicinity, the leakage magnetic flux penetrating the predetermined conductive film begins to be generated. By a change of this magnetic flux, an eddy current amount induced in the predetermined conductive film by electromagnetic induction changes. The eddy current is gradually induced and increases since the leakage magnetic flux penetrating the film increases in proportion as the film thickness decreases. By the eddy current generated in this wide area, a large mutual inductance is generated inside the predetermined conductive film. This mutual inductance operates such that a self-inductance of the sensor circuit system in a high frequency inductor type sensor decreases. In this manner, even when the film thickness of the conductive film decreases in the initial period, if the magnetic flux put into the conductive film is the extent of not penetrating the wafer, a constant eddy current is formed. After that, when the film thickness further decreases and becomes below the film thickness corresponding to the skin depth, a magnetic flux is generated, in which a part of the magnetic flux penetrates the conductive film on the wafer and leaks until the back side of the wafer. At this time, together with the increase of the leakage magnetic flux, the eddy current induced inside the film becomes large. Next, though the eddy current formed on the wafer surface up to a certain film thickness increases, after that, in proportion as the conductive film is further removed, the conductive film itself generating the eddy current decreases, and therefore, the eddy current decreases. As a result, in spite of a monotonous film thickness decrease process, accompanied with the increase of the magnetic flux once penetrated, the eddy current increases, and after that, accompanied with further decrease of the film thickness, and accompanied with the decrease of the volume itself generating the eddy current, the eddy current rapidly decreases, and therefore, a maximum point appears in the mutual inductance corresponding to the eddy current induced. By the rapid decrease of the eddy current, the mutual inductance also rapidly decreases, and the inductance of the sensor circuit system turns to an increase. In this manner, after the predetermined conductive film becomes the same as the skin depth or the film thickness in its vicinity by the progress of the polishing, the eddy current is generated, and by the rapid decrease after that, the inductance of the sensor circuit system once decreases, and after that, turns to an increase. By this behavior, a peak (inflection point) is generated in a waveform of the resonance frequency oscillated from a high frequency impedance type sensor. Based on this peak, a reference point before the polishing end point is detected, and from this reference point, the polishing end point is forecasted.

Since this peak appears by way of the film thickness corresponding to the skin depth, the eddy current amount induced as described above is no longer totally shifted so as to fluctuate the setting of the threshold value, and the peak continually appears at a position corresponding to the remaining film thickness. Particularly, when the conductive film is, for example, Cu, the remaining film of Cu has a peak emerged in the vicinity of 710 Å. Further, in the case of a W film, the remaining film of W has a peak emerged in a slightly thicker portion of 2500 Å. Although this film thickness is different from the actual skin depth, it has a numerical value corresponding to the skin depth. While a skin depth $\delta$ is an index conveniently showing a depth in which a strength of the electromagnetic wave becomes a magnitude of 1/e, since this peak position is decided by electrical conductivity and permeability of the material, frequency to be applied, and the like, it is brought about by the skin depth. The present invention is a technology achieved by skillfully using a singular phenomenon brought about by the skin effect of this material. Particularly, since the wiring material has high electrical conductivity in the CMP of the wiring material, the peak position appears as becoming an acute peak (maximum point) in the relatively end point vicinity (710 Å). Hence, without being swayed by various disturbances, robust end point detection/end point forecasting are made possible.

Further, the inductor type sensor does not intentionally and positively generate the eddy current inside the film so as to monitor the film thickness. In the conventionally known sensor, to give the magnetic field such as penetrating the conductive film, a sensor coil is formed so as to give directivity to the magnetic field. However, in the inductive type sensor in the present invention, a planar inductor is used. This is an inductor, which does not intend to give directivity to the magnetic field, but aims at moderately diffusing the magnetic field so as not to deeply invade the conductive film. This is because when the magnetic field deeply infiltrates or a strong magnetic field is given so as to allow the magnetic field to deeply infiltrate, the internal wiring is locally heated by the eddy current and the wiring itself is disconnected by electromigration and the like. Hence, the magnetic field is not allowed to infiltrate into the conductive film when possible. In other words, a configuration of a planar inductor is adopted, which forms a proper degree of magnetic flux distribution to the extent of not generating the eddy current to give damages to the element. Further, when the conductive film becomes thin just at the time of removing the conductive film, even when the magnetic field that diffuses in moderation is given, a part of the magnetic flux penetrating the conductive film appears. This sharp change arisen when the conductive film is put into a thin film state in the vicinity of the end point is monitored. As a result, the algorism that detects the frequency, the inductor and the signal thereof is configured to maximize the inflection point in the vicinity of the end point.

The second aspect of the present invention is a method for forecasting a polishing end point for polishing a conductive film and forecasting and detecting a polishing end point in a case when a predetermined conductive film is appropriately removed, wherein an inductor in an inductor type sensor is placed adjacent to the predetermined conductor film, and by the magnetic flux formed by the inductor, a change of magnetic flux induced in the predetermined conductive film is monitored, and based on a change of the magnetic flux by a skin effect with the material of the predetermined conductive film during the polishing decided as a factor, the characteristic change is detected, the polishing end point is forecasted by the characteristic change, at the same time, after detecting the characteristic change, the magnetic flux induced in the predetermined conductive film is alleviated or turned off.

According to this configuration, the current is let flow into the inductor to generate a magnetic flux, and at the same time, by the magnetic flux induced in the conductive film, the eddy current is formed, and immediately after the eddy current becomes the maximum, for example, the current let flow into the inductor is turned off or made small, thereby to turn off or alleviate the magnetic flux invading the conductive film.

In the conventional technology, the magnetic field is introduced into the conductive film, and by that magnetic field, the eddy current is generated. Then, an amount of the change of the eddy current is monitored, thereby to estimate the film thickness. In this case, to estimate the film thickness, it is necessary to continuously generate the eddy current. Likewise, when the polishing end point is forecasted, it is indispensable to continuously generate the eddy current.

In contrast to this, in the present invention, it is not seemed necessary to continuously generate the eddy current. The reason why is that the generation of the eddy current is suppressed due to the skin effect, and after that, when the film thickness decreases, a peak (inflection point) formed by the eddy current is carried at a point slightly before the polishing ends. With an intermediate time point showing this characteristic change before the end of the polishing taken as a reference point, the polishing end point is forecasted, and at the same time, the monitor may be turned off. For example, in the case of a CU film, the film thickness showing this characteristic change is approximately 710 Å, and even when the initial film thickness is approximately 7000 Å, it is a film thickness of approximately 10%, and appears immediately before the polishing. By detecting this reference point, it is possible to accurately forecast the polishing end point. Further, there is no need to feed the magnetic field to the conductive film and the element from this reference point. This is because, at a time point when the reference point immediately before the end is accurately monitored, the polishing endpoint can be almost accurately estimated. Hence, by alleviating the magnetic field which is allowed to invade into the element at a time point when this reference point serving as a characteristic change of point is detected or by stopping the magnetic field, it is possible to suppress the formation of the eddy current or forecast the polishing end point without giving damages to the element.

Further, as described in the [Conventional Art], in the polishing initial state, the conductive film of the surface protects the invasion of the magnetic field into the element. However, when the conductive film of the surface is once removed, the magnetic field invades into the element as it is. With the magnetic field invading into the element, a conducive film portion inside the element generates the eddy current, and depending on the circumstances, there are some cases where disconnections occur by electro-migration. Heretofore, since a film thickness monitor corresponds to a change of the eddy current amount, the conductive film thickness of the surface decreases, and during the film thickness of the conductive film decreases, the eddy current formed corresponding to the decreased film thickness amount decreases. Although the Joule heat generated inside the conductive film decreases by the decreased portion of the eddy current amount, the energy during that time is directed toward the element present downward the conductive film as it is. That is, a portion not consumed by the conductive film as the eddy current, that is, the Joule heat loss is directed toward the element as it is, and is consumed in the portion where the conductive film is present inside the element.

In contrast to this, in the present invention, in the polishing initial period, the magnetic flux hardly infiltrates into the conductive film. Hence, the magnetic field also hard to infiltrates into the element present downward thereof. As a result, the amount consumed of the energy inside the conductive film is infinitesimal, and is mostly discharged into the space, and the energy of the magnetic field is consumed in the space. After that, in proportion as the polishing progresses, a portion of the magnetic field penetrates into the conductive film to arrive at the element. However, almost all are repelled by a reversed magnetic field formed inside the conductive film, and the infiltration of the magnetic field into the element is prevented. The eddy current formed in the conductive film of the surface by corresponding to the increasing penetrating magnetic flux also increases, and almost all becomes an eddy current loss, that is, a Joule heat loss on the conductive film of the surface, and is consumed. Hence, though there are some of the magnetic fields that invade into the element, since the majority thereof is consumed as the Joule heat loss by the conductive film of the surface, the energy of the magnetic field exerted over the element is protected by the conductive film of the surface, and is alleviated to a large degree.

Although this behavior decreases until reaching the reference point, that is, the conductive film decreases by the polishing, in the process in which the eddy current amount increases, the conductive film of the surface protects the infiltration of the magnetic field into the element as much as possible, and alleviates the effect of the magnetic field to a large degree.

After that, when the polishing further progresses, in proportion as the film thickness decreases, the magnetic field further penetrates the conductive film and forms the eddy current, whereas the film thickness itself capable of forming the eddy current decreases. At this time, the eddy current transits to a decrease. The energy of the magnetic field not consumed by the conductive film of the surface infiltrates into the film as it is, and is absorbed inside the element. As the conductive film is removed, a portion in which the eddy current is formed becomes small, and as a result, the magnetic field infiltrating into the element becomes gradually large. Hence, in the film thickness decreasing process, rapidly from a point at which this reference point serving as a characteristic point of the change, that is, the formed amount of the eddy current transits from a rise to a fall, the magnetic flux is not consumed by the conductive film, but infiltrates into the element, and gives damages to the element.

In the present invention, since the formed amount of the eddy current generated in the conductive film of the surface by this reference point, that is, the skin effect shows a characteristic change of turning from a rise to a fall, the magnetic field for forming the eddy current decreases or is tuned off. As a result, far from preventing the infiltration of the magnetic field into the element accompanied with the decrease of the film thickness, the necessity itself of giving the magnetic field is eliminated, and in reality, the magnetic field is turned off there. The inflection point of the reference point may be confirmed and detected by the algorism of the software. As for a method for detecting the reflection point, while the differential coefficient of a waveform is monitored, it may be detected when the differential value becomes zero. From the point at which the differential value becomes zero, the eddy current amount in the conductive film of the surface decreases, and by that much portion, a load of the magnetic field energy is applied to the element side, and therefore, at the time point when the eddy current amount consumed by the conductive film adjusted by the influence of the skin effect becomes the maximum, the formation of the eddy current is turned off. As a result, without given an excessive magnetic field to the element, the end point of the removal of the conductive film of the surface can be accurately forecast.

Further, in the conventional technology, since a shaped magnetic flux high in directivity such as a pot type ferrite core is introduced into the conductive film, from the initial state status, the energy of the magnetic field consumed inside the conductive film and the element is larger than the energy of the magnetic field consumed in the space. In contrast to this, according to the present invention, since the planer inductor is used, instead of the conventional shaped magnetic field, the magnetic field intentionally diffused for the conductor is handled. For example, even if the eddy current is generated by the conductive film and a part of the magnetic field leaks into the element, its effect is extremely minimal. Hence, by that magnetic field, the element interior is hardly damaged.

The invention according to the third aspect of the present invention provides a method for forecasting the polishing end point in which the characteristic change in the change of the magnetic flux is at least either of an inflection point, a rise starting point, a rise amount or an amount of a change from a rise to a fall.

According to this configuration, when the predetermined conductive film becomes equal to the skin depth or the thickness in the vicinity thereof accompanied with the decrease of the film thickness by the progress of the polishing, a magnetic flux penetrating the conductive film begins to be generated, and the magnetic flux increases in proportion as the film thickness decreases. Hence, the eddy current generated by the magnetic flux also increases. Since the conductive film itself generating the eddy current by further decrease of the film thickness substantially decreases, the eddy current rapidly decreases. By this behavior of the eddy current, a change of magnetic flux induced in the predetermined conductive film, that is, the characteristic change appears as a remarkable change having an inflection point (peak) accompanied with a steep rise and a steep fall. Consequently, the forecasting of the polishing end point can be accurately performed not only in the case where the inflection point (peak) in the characteristic change is used, but also in the case where at least either of a rise starting point and an amount of the rise or an amount of change from the rise to the fall is used.

The invention according to the fourth aspect of the invention is a method for forecasting the polishing end point for forecasting and detecting the polishing end point in a case when a predetermined conductive film is appropriately removed, wherein an inductor in an inductor type sensor is placed adjacent to the predetermined conductor film, and by the magnetic flux formed by the inductor, a change of magnetic flux induced in the predetermined conductive film is monitored, and based on the skin effect decided with the material of the predetermined conductive film as a factor, there exist a process in which an eddy current formed accompanied with the decrease of the film thickness by a progress of the polishing increases and a process in which the eddy current formed accompanied with the decrease of the film thickness substantially decreases when the polishing is progressed as it is, and based on the characteristic change of the magnetic flux induced in the predetermined conductive film, the polishing end point is forecasted.

According to this configuration, until the predetermined conductive film reaches the film thickness corresponding to the skin depth by polishing, the magnetic flux induced in the predetermined conductive film by the magnetic flux formed by the inductor passes through the region of the skin depth approximately in parallel along the film surface. When the polishing progresses and the predetermined conductive film becomes equal to the skin depth or the film thickness in its vicinity, the leakage magnetic flux penetrating the predetermined conductive film begins to be generated. By a change of this magnetic flux, an eddy current amount induced in the predetermined conductive film by electromagnetic induction changes. In proportion as the film thickness decreases, the leakage magnetic flux penetrating the film increases, so that the eddy current increases. Since the conductive film itself generating the eddy current by further decrease of the film thickness substantially decreases, the eddy current rapidly decreases. By the presence of a process in which the eddy current increases based on this skin effect and a process in which the subsequent eddy current substantially decreases, a characteristic change is generated in the magnetic flux induced in the predetermined conductive film. From this characteristic change, the polishing end point can be accurately forecasted.

The invention according to the fifth aspect of the present invention is a method for forecasting the polishing end point for forecasting and detecting the polishing end point in a case when a predetermined conductive film is appropriately removed, wherein an inductor in an inductor type sensor is placed adjacent to the predetermined conductor film, and by the magnetic flux formed by the inductor, a change of magnetic flux induced in the predetermined conductive film is monitored, and based on the skin effect decided with the material of the predetermined conductive film as a factor, there exist a process in which an eddy current formed accompanied with the decrease of the film thickness by a progress of the polishing increases and a process in which the eddy current formed accompanied with the decrease of the film thickness substantially decreases when the polishing is progressed as it is, and based on the characteristic change of the magnetic flux induced in the predetermined conductive film, the polishing end point is forecasted, and at the same time, the magnetic flux induced in the predetermined conductive film is alleviated or turned off.

According to this configuration, when the polishing progresses and the predetermined conductive film becomes equal to the skin depth or the film thickness in its vicinity, by the presence of a process in which the eddy current increases and a process in which the eddy current substantially decreases by further decrease of the film thickness, a characteristic change is generated in the magnetic flux induced in the predetermined conductive film. From this characteristic change, the polishing end point is forecasted. Further, from a point when the characteristic change is generated and a process is reached in which the eddy current substantially decreases, the magnetic flux is not rapidly consumed by the conductive film, but a tendency of infiltration downward the conductive film is generated. Hence, based on the generation of the characteristic change, the magnetic flux induced in the predetermined conductive film is alleviated or turned off, so that the polishing end point is forecasted and a strong magnetic flux is suppressed from being exerted over the element, the minute wiring, and the like on the device wafer downward the conductive film.

The invention according to the sixth aspect of the present invention is a method for forecasting the polishing end point for forecasting and detecting the polishing end point in a case when a predetermined conductive film is appropriately removed, wherein an inductor in an inductor type sensor is placed adjacent to the predetermined conductor film, and by the magnetic flux formed by the inductor, a change of magnetic flux induced in the predetermined conductive film is monitored, and based on the skin effect decided with the material of the predetermined conductive film during polishing as a factor, a process in which the eddy current formed by the increase of the magnetic flux penetrating the predetermined conductive film increases accompanied with the decrease of the film thickness by the progress of the polishing is included, and based on the characteristic change of the magnetic flux induced in the predetermined conductive film by the eddy current, a method for forecasting the polishing end point for forecasting the polishing end point is provided.

According to this configuration, when the predetermined conductive film reaches the film thickness corresponding to the skin depth during the polishing, the magnetic flux induced in the predetermined conductive film by the magnetic flux formed by the inductor passes through a region of the skin depth approximately in parallel along the film surface. When the predetermined conductive film becomes equal to the skin depth or the film thickness in its vicinity accompanied with the decrease of this film thickness by the progress of the polishing, the magnetic flux penetrating the predetermined conductive film begins to be generated. By a change of this magnetic flux, an eddy current amount induced in the predetermined conductive film changes. In proportion as the film thickness decreases, the magnetic flux penetrating the film increases, so that the eddy current increases. Since the conductive film itself generating the eddy current by further decrease of the film thickness substantially decreases, the eddy current rapidly decreases. By this behavior of the eddy current, a characteristic change is generated in the magnetic flux induced in the predetermined conductive film. From this characteristic change, the polishing end point can be accurately forecast.

The invention according to the seventh aspect of the present invention is a method for forecasting the polishing end point for forecasting and detecting the polishing end point in a case when a predetermined conductive film is appropriately removed by polishing the conductive film, wherein an inductor in an inductor type sensor is placed adjacent to the predetermined conductor film, and by the magnetic flux formed by the inductor, a change of magnetic flux induced in the predetermined conductive film is monitored, and based on the skin effect decided with the material of the predetermined conductive film during the polishing as a factor, a process in which the eddy current formed by the increase of the magnetic flux penetrating the predetermined conductive film increases accompanied with the decrease of the film thickness by the progress of the polishing is included, and based on the characteristic change of the magnetic flux induced in the predetermined conductive film by the eddy current, the polishing end point is forecasted, and at the same time, a method for forecasting the polishing end point is provided, in which the magnetic flux induced in the predetermined conductive film is alleviated or turned off.

According to this configuration, a characteristic change is generated in the magnetic flux induced in the predetermined conductive film by the same behavior as the behavior of the eddy current in the operation of the invention according to the sixth aspect of the present invention, and from this characteristic change, the polishing end point is forecasted. Further, from a point when the characteristic change is generated and a process is reached in which the eddy current substantially decreases, the magnetic flux is not rapidly consumed, but a tendency of infiltration downward the conductive film is generated. Hence, based on the generation of the characteristic change, the magnetic flux induced in the predetermined conductive film is alleviated or turned off, so that the polishing end point is forecasted and a strong magnetic flux is suppressed from being exerted over the element, the minute wiring, and the like on the device wafer downward the conductive film.

According to the eighth aspect of the present invention, the inductor placed adjacent to the predetermined conductive film is a two-dimensional planar inductor, and provides a method for forecasting the polishing end point.

According to this configuration, in the conventional three-dimensionally formed inductor, there are often the cases where directivity for allowing the magnetic flux to infiltrate the conductive film in a vertical direction is improved, and the magnetic flux infiltrates until the interior of the device wafer and the wiring inside the device is disconnected by electromigration. In contrast to this, according to the method by this two-dimensional planar inductor, since the magnetic flux for the conductive film appropriately diffuses and has no directivity, the magnetic flux does not positively infiltrate into the conductive film. Further, when the frequency to give is a frequency larger than 30 MHz, the skin effect prevents the magnetic flux from further infiltrating into the conductive film, and it is, therefore, possible to prevent the disconnection due to the Joule heat by the generation of the eddy current inside the device wafer and the electromigration due to the excess current. Further, when the film thickness comes to a state in which the conductive film of the surface is just being removed, a part of the magnetic flux penetrates the conductive film, thereby to form the eddy current, and therefore, when the film thickness becomes the film thickness of the end point vicinity, an extremely remarkable characteristic change of the waveform corresponding to the mutual inductance is generated. From this characteristic change of the waveform, the completion time of the polishing can be accurately forecasted and detected.

The invention according to the ninth aspect of the present invention provides a method for forecasting the polishing end point in which the magnetic flux induced in the predetermined conductive film is alleviated or turned off by decreasing or turning off the current fed to the inductor.

According to this configuration, by the presence of a process in which the eddy current generated in the conductive film by the skin effect accompanied with the decrease of the conductive film by the progress of the polishing and a process in which the eddy current substantially decreases by the decrease of a film volume, a characteristic change of the magnetic flux is generated. From this characteristic change of the magnetic flux, the polishing end point can be forecasted. Further, after the detection of this characteristic change, the magnetic flux induced in the conductive film is alleviated or turned off by decreasing or turning off the current of high frequency fed to the inductor in the inductor type sensor is decreased or turned off, it is possible to suppress the excess magnetic field from being exerted over the element formed in the device wafer downward the conductive film.

According to the tenth aspect of the present invention, a method for forecasting the polishing end point is provided, wherein the monitoring of a change of the magnetic flux induced based on the skin effect of the predetermined conductive film is at least any one of the measurement of the eddy current in the predetermined conductive film, the measurement of a mutual inductance generated by the occurrence of the eddy current by the predetermined conductive film, the measurement of a change of inductance or a change of impedance of the sensor circuit system in the inductor type sensor by the mutual inductance of the predetermined conductive film or the measurement by a change of resonance frequency when a change of inductance of the sensor circuit system is oscillated by connecting the inductor and capacitor in parallel.

According to this configuration, the monitoring of a change of the magnetic flux induced based on the skin effect of the predetermined conductive film is, specifically, to respectively measure at least any change of the eddy current accompanied with the change of the magnetic flux, the mutual inductance, the inductance or the impedance of the sensor circuit system or the resonance frequency oscillated by the inductor type sensor, and the magnetic flux penetrating the predetermined conductive film by the progress of the polishing increases, and the generation of the characteristic change of the magnetic flux before the polishing end point is positively forecasted.

According to the eleventh aspect of the present invention, with respect to the method for forecasting the polishing end point from the characteristic change of the magnetic flux, a film thickness amount corresponding to the characteristic change of the magnetic flux is set, and after the polishing time portion set in advance from the film thickness amount is polished, the polishing is taken as completed.

According to this configuration, the characteristic change of the magnetic flux is detected at a point when the film thickness becomes a film thickness corresponding to a skin depth decided by the film thickness amount with the material of the conductive film as a factor. Hence, from a polishing rate to be executed after the detection of the characteristic change, a necessary polishing time after the detection of the characteristic change can be set in advance. Consequently, after the characteristic change is detected, the polishing is completed by polishing the polishing time portion only set in advance.

According to the twelfth aspect of the present invention, a method for forecasting the polishing end point is provided, wherein a film thickness amount corresponding to the characteristic change of the magnetic flux is set, and the remaining polishing time required from the film thickness amount to the polishing end point is calculated, and after a time portion calculated from a point of the film thickness amount corresponding to the characteristic change of the magnetic flux is polished, the polishing is taken as completed.

According to this configuration, the characteristic change of the magnetic flux is detected at a point when the film thickness becomes a film thickness corresponding to a skin depth decided by the film thickness amount with the material of the conductive film as a factor. The film thickness corresponding to the skin depth which is the remaining film amount in the characteristic change is divided by the polishing rate to be executed after the detection of the characteristic change, so that a required polishing time after the detection of the characteristic change is calculated. Consequently, after the detection of the characteristic change, by polishing the calculated polishing time portion only, the polishing is completed.

According to the thirteenth aspect of the present invention includes a high frequency inductor type sensor provided with an oscillator circuit configuring a sensor circuit system made of a planer inductor and a capacitor at a position opposite to the predetermined conductive film at the polishing time in a polishing apparatus for allowing a predetermined conductive film of a wafer surface to slide on a polishing pad and performing a polishing work, and from a planar inductor, the predetermined conductive film is given a magnetic field, and by that magnetic field, a reversed magnetic field generated in the predetermined conductive film is detected, thereby to forecast the polishing end point, wherein during the period from a removal start to the end of the removal of the predetermined conductive film, accompanied with the decrease of the film thickness by the progress of the polishing, at least any of a frequency given to the planar inductor, an inductor shape or a distance between the planar inductor and conductive film is made appropriate so that there exist a process in which an eddy current generated in the predetermined conductive film by the introduced magnetic field increases and a process in which, accompanied with the decrease of the film thickness when the polishing is progressed as it is, the eddy current generated in the predetermined conductive film by the introduced magnetic field decreases.

According to this configuration, in the forecasting device of the polishing end point, in order to generate a characteristic change of the magnetic flux immediately before the polishing end point, it is necessary to allow a process to be available during a period from a removal start to a removal end of the conductive film, in which a part of the magnetic flux leaks and increase the eddy current accompanied with the decrease of the film thickness from a process in which the magnetic flux does not infiltrate into the conductive film due to the skin effect, and after that, when the magnetic flux penetrates in some degrees, the eddy current decreases according to the decrease of the substantial volume of the conductive film. The generation of this characteristic change does not simply depend on the frequency only given to the planar inductor. Even when the frequency given to the planar inductor is the same, depending on the inductor shape or the distance between the planer inductor and the conductive film, the directivity of the magnetic field for the conductive film changes, and an behavior of the magnetic field infiltrating into the conductive film changes sometimes. In such a case, it is often that, during a period from a removal start to a removal end of the conductive film, a process of the increase and decrease of the eddy current to generate the characteristic change does not occur. In contrast to this, by optimizing at least any of the frequency given to the planar inductor, the inductor shape or the distance between the planar inductor and the conductive film, a process of the increase and the decrease of the eddy current to generate the characteristic change immediately before the polishing end point can be generated.

[Advantages of the Invention]

According to the first aspect of the present invention, an inductor in an inductor type sensor is placed adjacent to the predetermined conductor film, and by the magnetic flux formed by the inductor, a change of magnetic flux induced in the predetermined conductive film is monitored, and based on the change of the magnetic flux by a skin effect decided by the film thickness during the polishing with the material of the predetermined conductive film as a factor, a characteristic change is detected, and from the characteristic change, the polishing end point is forecasted. Consequently, in the polishing initial period, the magnetic flux induced in the predetermined conductive film passes through a region of the skin depth in parallel along the firm surface approximately. As a result, without exerting strong magnetic fluxes up to the element, the minute wiring, and the like on the device wafer downward the predetermined conductive film and also with the generation of the eddy current suppressed, the Joule heat loss by the eddy current can be suppressed to the minimum. Subsequent to a stage in which the predetermined conductive film reaches a film thickness corresponding to the skin depth by the progress of the polishing, the leakage magnetic flux penetrating the predetermined conductive film is generated, and by this leakage magnetic flux, an eddy current is induced in the predetermined conductive film. This eddy current gradually increases by the increase of the leakage magnetic flux accompanied with the decrease of the film thickness, and by further decrease of the film thickness, the volume of the conductive film itself generating the eddy current decreases, and therefore, the eddy current rapidly decreases. By this increase and subsequent rapid decrease of the eddy current, the inductance of the sensor circuit system decreases once, and after that, turns to an increase. By this behavior, an inflection point (peak) is generated in the waveform of the resonance frequency oscillated from the inductor type sensor. This inflection point does not sway by various disturbances, and constantly appears on a position corresponding to the remaining film thickness. Hence, advantages are afforded that, from the reference point detected based on this inflection point, the polishing end point can be accurately forecasted and detected.

According to the second aspect of the present invention, an inductor in an inductor type sensor is placed adjacent to the predetermined conductor film, and by the magnetic flux formed by the inductor, a change of magnetic flux induced in the predetermined conductive film is monitored, and based on a change of the magnetic flux by a skin effect decided with the material of the predetermined conductive film during the polishing as a factor, a characteristic change is detected, and from the characteristic change, a polishing end point is forecasted, and at the same time, after the detection of the characteristic change, a magnetic flux induced in the predetermined conductive film is alleviated or turned off. Consequently, in the polishing initial period, the generation of the eddy current is suppressed by the influence of the skin effect, and after that, by the presence of a process in which the eddy current generated in the conductive film by the skin effect accompanied with the decrease of the predetermined conductive film by the progress of the polishing increases and a process in which the eddy current substantially decreases by the decrease of a film volume, a characteristic change is generated in the magnetic flux. From this characteristic change of the magnetic flux before polishing end, the polishing end point can be accurately forecasted and detected. Further, after the generation of this characteristic change, from a point when the formed amount of the eddy current substantially turns to a decrease, the magnetic flux is not rapidly consumed in the conductive film, but a tendency of infiltration downward the conductive film is generated. Hence, after the detection of the characteristic change, the magnetic flux induced in the predetermined conductive film is alleviated or turned off, so that the advantages are afforded that the polishing end point can be accurately forecast and the strong magnetic flux is prevented from exerting over the element, the minute wiring, and the like on the device wafer downward the conductive film.

According to the third aspect of the present invention, the characteristic change in the change of the magnetic flux is at least either of an inflection point, a rise starting point, a percentage of rise, a rise amount or an amount of change from a rise to a fall, and therefore, the characteristic change of the magnetic flux induced in the predetermined conductive film appears as a remarkable change having an inflection point (peak) accompanied with a steep rise and a steep fall. Consequently, the advantages are afforded that the forecasting of the polishing end point can be accurately performed not only in the case where the inflection point in the characteristic change is used, but also in the case where at least either of a rise starring point, a percentage of the rise and an amount of the rise or an amount of change from the rise to the fall in the characteristic change is used.

According to the fourth aspect of the present invention, an inductor in an inductor type sensor is placed adjacent to the predetermined conductor film, and by the magnetic flux formed by the inductor, a change of magnetic flux induced in the predetermined conductive film is monitored, and based on the skin effect decided with the material of the predetermined conductive film as a factor, there exist a process in which an eddy current formed accompanied with the decrease of the film thickness by a progress of the polishing increases and a process in which the eddy current formed accompanied with the decrease of the film thickness substantially deceases when the polishing is progressed as it is, and based on the characteristic change of the magnetic flux induced in the predetermined conductive film, the polishing end point is forecasted. Consequently, by the presence of a process in which the eddy current generated in the conductive film increases by the skin effect accompanied with the decrease of the film thickness of the predetermined conductive film by the progress of the polishing and a process in which the eddy current substantially decreases by the decrease of a film volume, a characteristic change of the magnetic flux induced in the predetermined conductive film is generated. Thus, the advantages are afforded that from this characteristic change of the magnetic flux, the polishing end point can be accurately forecast and detected.

According to the fifth aspect of the present invention, an inductor in an inductor type sensor is placed adjacent to the predetermined conductor film, and by the magnetic flux formed by the inductor, a change of magnetic flux induced in the predetermined conductive film is monitored, and based on the skin effect decided with the material of the predetermined conductive film as a factor, there exist a process in which an eddy current formed accompanied with the decrease of the film thickness by a progress of the polishing increases and a process in which the eddy current formed accompanied with the decrease of the film thickness substantially deceases when the polishing is progressed as it is, and based on the characteristic change of the magnetic flux induced in the predetermined conductive film, the polishing end point is forecasted, and at the same time, the magnetic flux induced in the predetermined conductive film is alleviated or turned off. Consequently, a characteristic change is generated in the magnetic flux induced in the predetermined conductive film by the same behavior as the behavior of the eddy current in the operation of the invention according to the fourth aspect of the invention. From this characteristic change, the polishing end point can be accurately forecast and detected. Further, when the characteristic change is generated and a process is reached in which the eddy current substantially decreases, the magnetic flux is not rapidly consumed, but a tendency of infiltration downward the conductive film is generated. Hence, based on the generation of the characteristic change, the magnetic flux induced in the predetermined conductive film is alleviated or turned off, so that the advantages are afforded that, polishing end point is forecasted and a strong magnetic flux is suppressed from being exerted over the element, the minute wiring, and the like on the device wafer downward the conductive film.

According to the six aspect of the present invention, an inductor in an inductor type sensor is placed adjacent to the predetermined conductor film, and by the magnetic flux formed by the inductor, a change of magnetic flux induced in the predetermined conductive film is monitored, and based on the skin effect decided with the material of the predetermined conductive film during the polishing as a factor, and accompanied with the decrease of the film thickness by a progress of the polishing, the magnetic flux penetrating the predetermined conductive film increases, so that a process in which a formed eddy current increases is included, and based on the characteristic change of the magnetic flux induced in the predetermined conductive film by the eddy current, the polishing end point is forecasted. Consequently, when the predetermined conductive film becomes equal to the skin depth or the thickness in the vicinity thereof accompanied with the decrease of the film thickness by the progress of the polishing, the magnetic flux penetrating the predetermine conductive film is generated, and this magnetic flux increases accompanied with the decrease of the film thickness. Therefore, the eddy current induced in the predetermined conductive film increases by the magnetic flux. By further decrease of the film thickness, the volume of the conductive film generating the eddy current decreases, and therefore, the eddy current rapidly decreases. Thus, the advantages are afforded that, by this behavior of the eddy current, a characteristic change is generated in the magnetic flux induced in the predetermined conductive film and from this characteristic change, the polishing end point can be accurately forecasted and detected.

According to the seventh aspect of the present invention, an inductor in an inductor type sensor is placed adjacent to the predetermined conductor film, and by the magnetic flux formed by the inductor, a change of magnetic flux induced in the predetermined conductive film is monitored, and based on the skin effect decided with the material of the predetermined conductive film during the polishing as a factor, and accompanied with the decrease of the film thickness by a progress of the polishing, the magnetic flux penetrating the predetermined conductive film increases, so that a process in which a formed eddy current increases is included, and based on the characteristic change of the magnetic flux induced in the predetermined conductive film by the eddy current, the polishing end point is forecasted, and at the same time, the magnetic flux induced in the predetermined conductive film is alleviated or turned off. Consequently, a characteristic change is generated in the magnetic flux induced in the predetermined conductive film during polishing by the same behaviors of the magnetic flux and the eddy current as the behaviors of the magnetic flux and the eddy current in the operation of the invention according to the sixth aspect of the invention. From this characteristic change of the magnetic flux, the polishing end point can be accurately forecasted and detected. Further, when the characteristic change is generated and a process is reached in which the eddy current substantially decreases, the magnetic flux is not rapidly consumed by the predetermined conductive film, but a tendency of infiltration downward the conductive film is generated. Hence, the advantages are afforded that based on the generation of the characteristic change, the magnetic flux induced in the predetermined conductive film is alleviated or turned off, so that the polishing end point is forecasted and a strong magnetic flux is suppressed from being exerted over the element, the minute wiring, and the like on the device wafer downward the conductive film.

According to the eight aspect of the present invention, since the inductor placed adjacent to the predetermined conductive film is a two-dimensional planer inductor, the magnetic flux formed by the two-dimensional planar inductor moderately diffuses and has no directivity with respect to the predetermined conductive film. Therefore, until the predetermined conductive film becomes a film thickness corresponding to the skin depth by the progress of the polishing, the magnetic flux is unable to positively infiltrate into the predetermined conductive film. Further, since the infiltration of the magnetic flux into the device wafer area downward the conductive film is suppressed by the skin effect, the disconnection by the Joule heat due to the eddy current generation inside the device wafer and electromigration can be effectively prevented. Further, when the film thickness comes to a state in which the conductive film of the surface is just being removed, a part of the magnetic flux penetrates the conductive film, and the formed amount of the eddy current increases, and then, by the decrease of the film volume, the eddy current substantially decreases, so that an extremely remarkable characteristic change of the magnetic flux is generated. Hence, from this characteristic change of the magnetic flux, the polishing end point can be accurately forecasted and detected.

According to the ninth aspect of the present invention, the magnetic flux induced in the predetermined conductive film is alleviated or turned off by decreasing or turning off the current fed to the inductor. Consequently, by the presence of a process in which the eddy current generated in the conductive film by the skin effect accompanied with the decrease of the conductive film by the progress of the polishing and a process in which the eddy current substantially decreases by the decrease of a film volume, a characteristic change of the magnetic field is generated. From this characteristic change of the magnetic flux, the polishing endpoint can be forecasted. After the detection of the characteristic change, the current of high frequency fed to the inductor in the inductor type sensor is decreased or turned off, so that the advantages are afforded that the magnetic flux induced in the conductive film can be alleviated or turned off and a excess magnetic field is prevented from being exerted over the element formed in the device wafer downward the conductive film.

According to the tenth aspect of the present invention, the monitoring of a change of the magnetic flux induced based on the skin effect of the predetermined conductive film is at least any one of the measurement of the eddy current in the predetermined conductive film, the measurement of a mutual inductance generated by the occurrence of the eddy current by the predetermined conductive film, the measurement of a change of inductance or a change of impedance of the sensor circuit system in the inductor type sensor by the mutual inductance of the predetermined conductive film or the measurement by a change of resonance frequency when a change of inductance of the sensor circuit system is oscillated by connecting the inductor and capacitor in parallel. Consequently, the monitoring of the change of the magnetic flux induced in the predetermined conductive film uses, specifically, at least any change of the eddy current, the mutual inductance, the inductance or impedance of the sensor circuit system or the resonance frequency oscillated by the inductor type sensor, which are accompanied with the change of the magnetic flux, respectively, so that the advantages are afforded that the generation of the characteristic change of the magnetic flux and the like immediately before the polishing end point can be more easily and definitely detected.

According to the eleventh aspect of the present invention, with respect to the method for forecasting the polishing end point from the characteristic change of the magnetic flux, a film thickness amount corresponding to the characteristic change of the magnetic flux is set, and after the polishing time portion set in advance from the film thickness amount is polished, the polishing is taken as completed. Consequently, the characteristic change of the magnetic flux is detected at a point when the remaining film amount becomes a film thickness corresponding to the skin depth. Hence, from a polishing rate to be executed after the detection of this remaining film amount and the characteristic change, it is possible to set in advance the necessary polishing time after the detection of the characteristic change. Consequently, the advantages are afforded that, after the characteristic change is detected, by polishing the polishing time portion only set in advance, the predetermined conductive film can be appropriately polished and removed.

According to the twelfth aspect of the present invention, with respect to the method for forecasting the polishing end point from the characteristic change of the magnetic flux, a film thickness amount corresponding to the characteristic change of the magnetic flux is set, and the remaining polishing time required from the film thickness amount to the polishing end point is calculated, and after a time portion calculated from a point of the film thickness amount corresponding to the characteristic change of the magnetic flux is polished, the polishing is taken as completed. Consequently, the characteristic change of the magnetic flux is detected at a point when the remaining film amount becomes a film thickness corresponding to the skin depth. Hence, by dividing this remaining amount by the polishing rate to be executed after the detection of the characteristic change, the necessary polishing time after the detection of the characteristic change can be calculated. Consequently, the advantages are afforded that, after the detection of the characteristic change, by polishing the calculated polishing time portion only, the predetermined conductive film can be appropriately polished and removed.

According to the thirteenth aspect of the present invention, a forecasting device of a polishing end point in a polishing apparatus for allowing the predetermined conductive film of a wafer surface to slidingly contact with a polishing pad and performing a polishing operation, comprising a high frequency inductor type sensor provided with an oscillator circuit configuring a sensor circuit system made of a planer inductor and a capacitor opposite to the predetermined conductive film at the polishing time, wherein, from the planar inductor, the predetermined conductive film is given a magnetic field, and by that magnetic field, a reversed magnetic field generated in the predetermined conductive film is detected, thereby to forecast the polishing end point, and wherein, during the period from a removal start to the removal end of the predetermined conductive film, accompanied with the decrease of the film thickness by the progress of the polishing, at least any of a frequency and an inductor shape given to the planar inductor or a distance between the planar inductor and conductive film is optimized so that there exist a process in which an eddy current generated in the predetermined conductive film increases by the introduced magnetic field and a process in which accompanied with the decrease of the film thickness when the polishing is progressed as it is, the eddy current generated in the predetermined conductive film decreases by the introduced magnetic field. Consequently, in the forecasting device of the polishing end point including the high frequency inductor type sensor provided with the oscillation circuit configuring the sensor circuit system made of the planer inductor and the capacitor at the opposite position to the predetermined conductive film during polishing, at least any of a frequency and an inductor shape given to the planar inductor or a distance between the planar inductor and the predetermined conductive film is optimized, so that a directivity of the magnetic field for the conductive film can be appropriately set. Consequently, a process of the increase and decrease of the eddy current is generated by the skin effect during a period of the removal start to the removal end of the predetermined conductive film, so that the characteristic change of the magnetic flux can be generated immediately before the polishing end point. As a result, the advantages are afforded that, from the characteristic change of the magnetic flux, the polishing end point can be accurately forecasted and detected.

BRIEF DESCRIPTION OF THE DRAWINGS

FIG. 5 are views showing a configuration example of the forecasting device of the polishing end point according to the embodiment of the present invention.

FIG. 6 are views showing a basic configuration example of an oscillation circuit in the forecasting device of the polishing end point of FIG. 5.

FIG. 7 are views showing a result of an electromagnetic simulation conducted to see which direction a magnetic field generated from a coil is arranged on a conductor film in the embodiment of the present invention, and FIG. 7A is a case in which the oscillation frequency from a sensor is 1 MHz and the film thickness of the conductor film is 0.2 µm, and FIG. 7B is a case in which the oscillation frequency from the sensor is 1 MHz and the film thickness of the conductor film is 1 µm, and FIG. 7C is a case in which the oscillation frequency from the sensor is 40 MHz and the film thickness of the conductor film is 0.2 µm, and FIG. 7D is a case in which the oscillation frequency from the sensor is 40 MHz and the film thickness of the conductor film is 1 µm;

FIG. 11 are combined views for explaining a change example of the magnetic flux and the like and a detection operation of a film thickness reference point accompanied with polishing removal of the conductive film by the chemical mechanical polishing apparatus of FIG. 1, and FIGS. 10A to 10D are views showing a change example of the magnetic flux and the like accompanied with polishing removal of the conductive film, and FIG. 11E is a characteristic view showing a change example of the resonance frequency for a film thickness change of the conductor film;

FIG. 12 are combined views as an comparison example of FIG. 9, and FIGS. 12A to 12D are views showing change example s of the magnetic flux and the eddy current accompanied with polishing removal of the conductive film, and FIG. 12E is a characteristic view showing an change example of the resonance frequency for the film thickness change of the conductor film;

FIG. 13 are views showing a change of the magnetic flux corresponding to the energy consumption of the magnetic field in the embodiment of the present invention.

FIG. 14 are views as a comparison example of FIG. 13.

FIG. 15 are views for explaining the energy consumption of the magnetic field.

FIG. 15A is a view showing a wafer with Cu film, and FIG. 15B is a view showing a change characteristic example of the resonance frequency for the film thickness of the Cu film, and FIG. 15C is a view showing the wafer with tungsten (W) film, and FIG. 15D is a view showing the change characteristic example of the resonance frequency for the film thickness of the tungsten (W) film; and FIG. 17 are views showing the relation between the film thickness and the resonance frequency in the case where the conductive film of the polishing target is Cu in the embodiment of the present invention.

DESCRIPTION OF THE PREFERRED EMBODIMENTS

The present invention is a method for forecasting a polishing end point for forecasting and detecting a polishing end point when the conductive film is polished and the predetermined conductive film is approximately removed to achieve an object of accurately forecasting and detecting a polishing end point, wherein without exerting a strong magnetic flux up to an element, a minute wiring, and the like formed on a device wafer downward a conductive film, and as a result, the generation of an eddy current induced by electromagnetic induction is suppressed and a Joule heat loss due to the eddy current is suppressed to the minimum, and at the same time, the situation is eliminated in which the eddy current amount induced by a change of the gap between a sensor and the conductive film and an intervening normal state of dielectric substances such as slurry is totally shifted so that the setting of a threshold value is changed in such a large degree that the threshold value becomes difficult to be detected, and even when a magnetic field is minute to an extent of not penetrating a device wafer, the magnetic field can be sufficiently and accurately detected, and a polishing end point is accurately forecasted and detected, and wherein an inductor in an inductor type sensor is placed adjacent to the predetermined conductor film, and by the magnetic flux formed by the inductor, a change of magnetic flux induced in the predetermined conductive film is monitored, and based on a change of the magnetic flux by a skin effect decided with the material of the predetermined conductive film during the polishing as a factor, a characteristic change is detected, and from the characteristic change, a polishing end point is forecasted, and at the same time, after the detection of the characteristic change, the magnetic flux induced in the predetermined conductive film is alleviated or turned off.

First Embodiment

Figure 1:
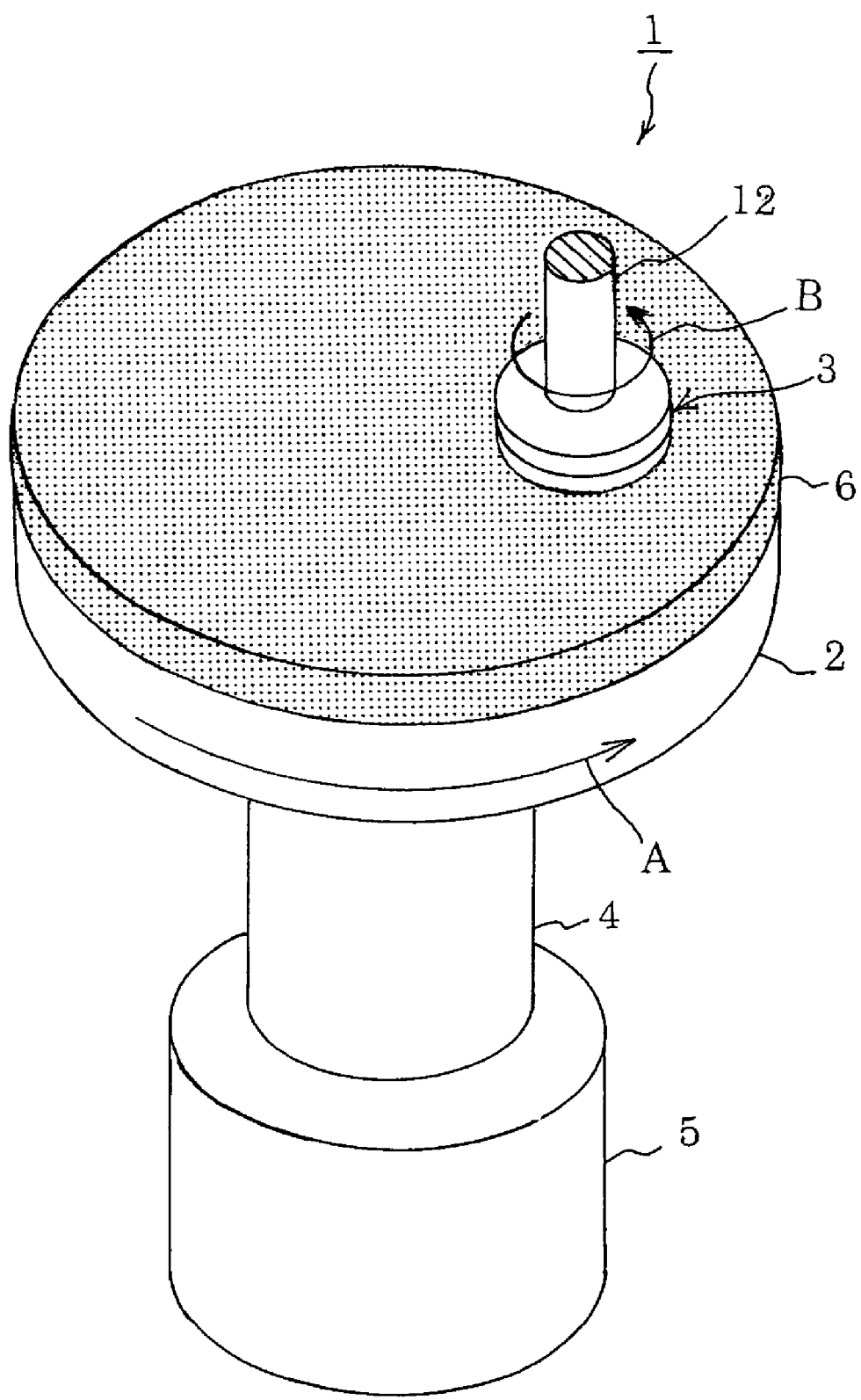
FIG. 1 is a perspective view of a chemical mechanical polishing apparatus incorporated with a forecasting device of a polishing end point according to an embodiment of the present invention.
Figure 2:
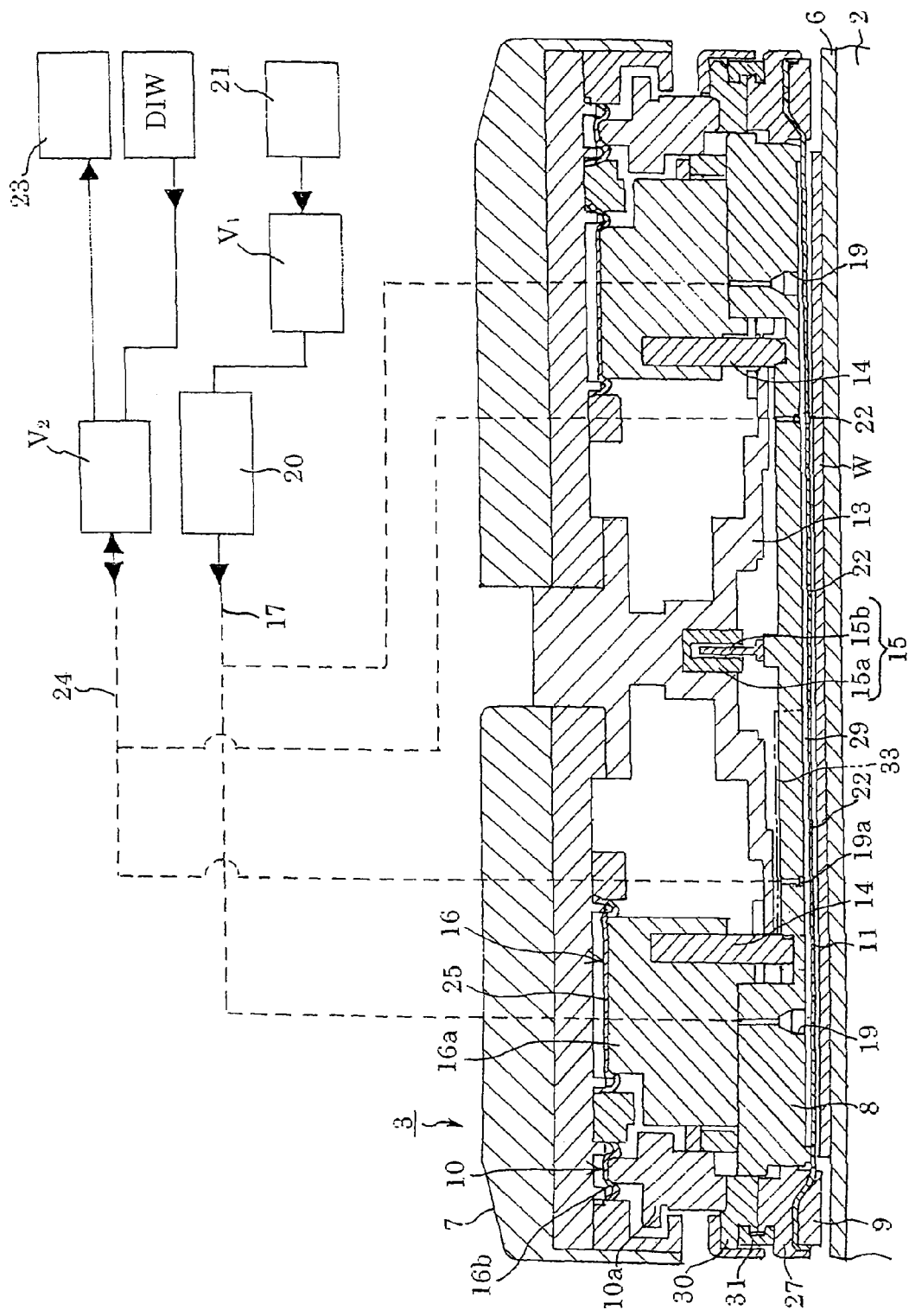
FIG. 2 is an enlarged longitudinal sectional view of a polishing head in the chemical mechanical polishing apparatus of FIG. 1.
Figure 3:
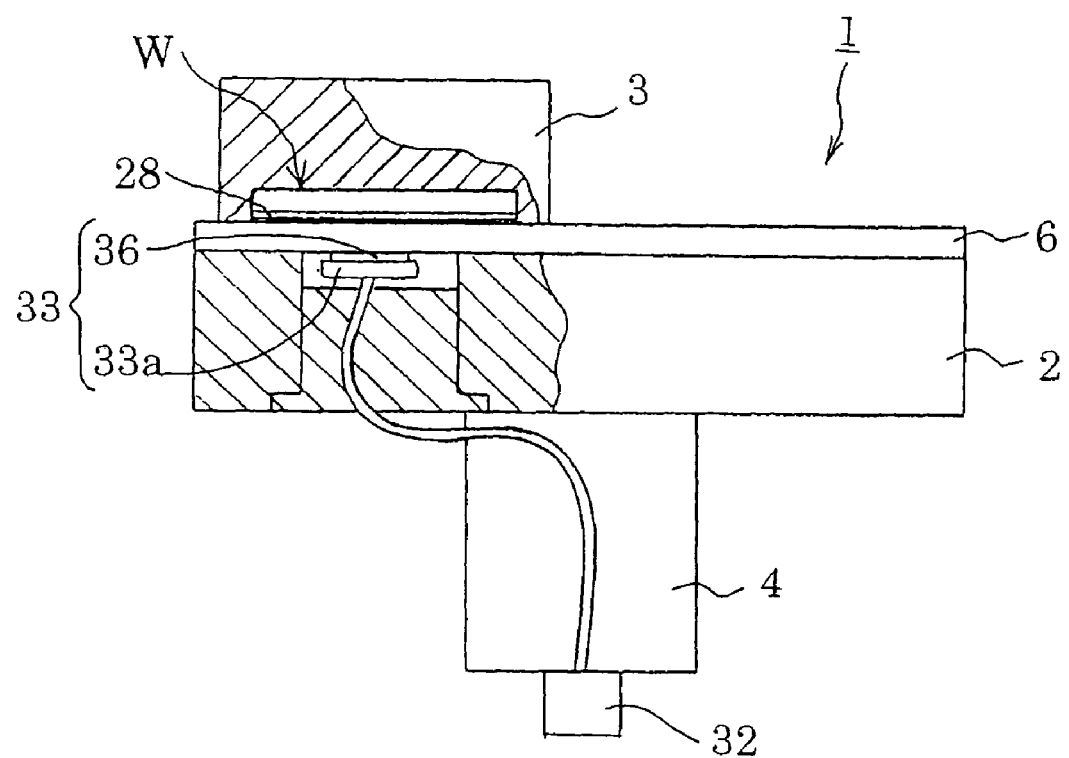
FIG. 3 is a schematic side view shown by being partially broken for explaining a state in which the forecasting device of the polishing end point according to the embodiment of the present invention is incorporated into a platen.
Figure 4:
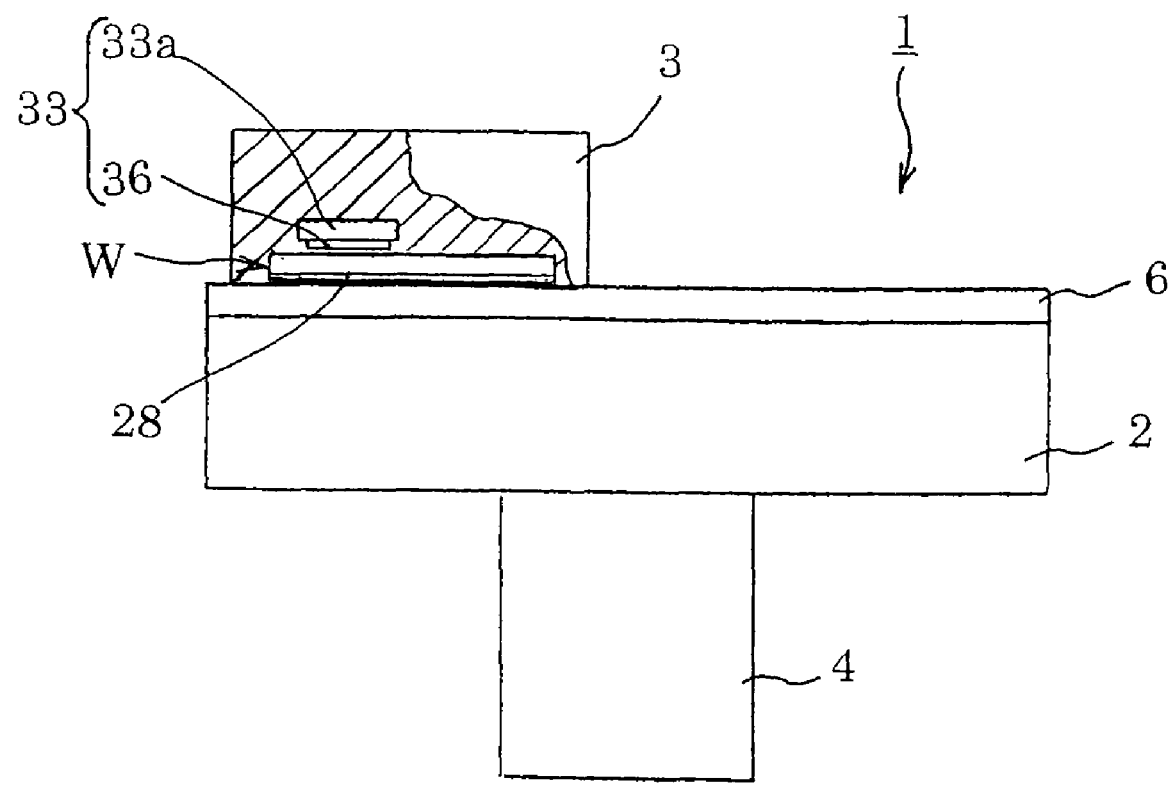
FIG. 4 is a schematic side view shown by being partially broken for explaining a state in which the forecasting device of the polishing end point according to the embodiment of the present invention is incorporated into a polishing head.

Hereinafter, a method and device for forecasting a polishing end point according to an embodiment of the present invention will be described in detail with reference to the drawings. FIG. 1 is a perspective view of a chemical mechanical polishing device built with a forecasting device of the polishing end point; FIG. 2 is an enlarged longitudinal-sectional view of a polishing head; FIG. 3 is a schematic side view showing a partial breakage for explaining a state in which the forecasting device of the polishing end point is incorporated into the platen; and FIG. 4 is a schematic side view showing a partial breakage for explaining a state in which the forecasting device of the polishing end point is incorporated into the polishing head.

First, a configuration of the method and device for forecasting the polishing end point according to the present embodiment will be described from a configuration of a chemical mechanical polishing apparatus applied with this configuration In FIG. 1, the chemical mechanical polishing apparatus 1 is mainly formed of a platen 2 and a polishing head 3. The platen 2 is formed in a disc shape, and its undersurface center is connected with a rotation axis 4, and is rotated in an arrow A direction by the driving of a motor 5. The upper surface of the platen 2 is adhered with a polishing pad 6, and on this polishing pad 6, slurry which is a mixture of an abrasive agent and a chemical agent is supplied from an unillustrated nozzle.

The polishing head 3, as shown in FIG. 2, is mainly formed of a control means such as a head main body 7, a carrier 8, a retainer-ring 9, a retainer-ring pressing means 10, an elastic sheet 11, a carrier pressing means 16, and an air.

The head main body 7 is formed in a disc shape smaller than that of the platen 2, and the upper surface center is connected with a rotation axis 12 (see FIG. 1). The head main body 7 is pivoted to the rotation axis 12, and is driven by an unillustrated motor, and is rotated in an arrow direction B of FIG. 1.

The carrier 8 is formed in a disc shape, and is disposed in the center of the head main body 7. Between the upper surface center portion of the carrier 8 and the center bottom portion of the head main body 7, a dry plate 13 is provided, and is transferred with a rotation from the head main body 7 through pins 14 and 14.

Between the center bottom portion of the dry plate 13 and the center upper portion of the carrier 8, an operation transformer main body 15a is fixed, and further, on the center upper portion of the carrier 8 is fixed with a core 15b of an operation transformer 15, and is connected to an unillustrated control portion, and outputs a polishing state signal of a conductive film made of Cu and the like formed on a wafer W (lower side of FIG. 2 ).

The upper surface peripheral edge portion of the carrier 8 is provide with a carrier pressing member 16a, and the carrier 8 is transmitted with a pressing force from the carrier pressing means 16 through the carrier pressing member 16a.

The undersurface of the carrier 8 is provided with an air outlet 19 for injecting the air into the elastic sheet 11 from an air float line 17. The air float line 17 is connected to an intake pump 21 serving as an air supply source through an air filter 20 and an automatic switching valve V1. An air outlet from the air outlet 19 is executed by switching the automatic switching valve V1.

The undersurface of the carrier 8 is formed with a hole 22 for blowing out a vacuum and a DIW (purified water) as needed or an air. Suction of the air is executed by the driving of the vacuum pump 23. An automatic switching valve V2 is provided in a vacuum line 24, and by switching the automatic switching valve V2, the feed of the vacuum and the DIW is executed through the vacuum line 24.

The feed of the air from the air float line 17, the vacuum operation from the vacuum line 24, the feed of the DIW, and the like are executed by a command signal from the control portion.

The carrier pressing means 16 is disposed in the center portion peripheral edge of the undersurface of the head main body 7, and gives a pressing force to the carrier pressing member 16a, so that the pressing force is transmitted to the carrier 8 connected thereto. This carrier pressing means 16 is preferably formed of an air bag 25 made of a rubber sheet which is expanded and contracted by suction and exhaust of the air. The air bag 25 is connected with an unillustrated air feed mechanism for feeding the air.

The retainer ring 9 is formed in a ring shape, and is disposed at the outer periphery of the carrier 8. This retainer ring 9 is fitted to the retainer ring holder 27 provided in the polishing head 3, and its inner peripheral portion is adhered with the elastic sheet 11.

The elastic sheet 11 is formed in a circular form, and the plurality of holes 22 are pored. The elastic sheet 11 is adhered in the inside of the retainer ring 9 by sandwiching the peripheral edge portion between the retainer ring 9 and retainer ring holder 27.

The undersurface of the carrier 8 adhered with elastic sheet 11 is formed with an air chamber 29 between the carrier 8 and the elastic sheet 11. A wafer W formed with a conductive film is pressed to the carrier 8 through the air chamber 29. The retainer ring holder 27 is fitted to a fitting member 30 formed in a ring shape through a snap ring 31. The fitting member 30 is connected with a retainer ring pressing member 10a. The retainer ring 9 is transmitted with a pressing force from the retainer ring pressing means 10 through this retainer ring pressing member 10a.

The retainer ring pressing means 10 is disposed in the outer peripheral portion of the undersurface of the head main body 7, and by giving the pressing force to the retainer ring pressing member 10a, the retainer ring 9 connected thereto is pressed to the polishing pad 6. This retainer ring pressing means 10 is also preferably formed of an air bag 16b made of rubber sheet similarly to the carrier pressing means 16. The air bag 16b is connected with an unillustrated air feed mechanism for feeding the air.

As shown in FIG. 3 or 4, a part of the upper portion of the platen 2 in the chemical mechanical polishing apparatus 1 or a part of the carrier 8 of the polishing head 3 is built with one each of a forecasting device 33 of the polishing end point. When the forecasting device 33 of the polishing end point is incorporated into the platen 2 side, the detection signal and the like of the characteristic change from the forecasting device 33 of the polishing end point is outputted to the outside through a slip ring 32.

Two sets or more of the forecasting device 33 of the polishing end point may be incorporated into a part of the upper portion of the platen 2 or a part of the carrier 8 of the polishing head 3. By incorporation two or more of the forecasting device 33 of the polishing end point, film thickness information is collected in time sequence from the forecasting device 33 of the polishing end point at the front side in a rotational direction, so that distribution information and the like on the change of the film thickness of a conductive film 28 inside a wafer W surface can be obtained.

Figure 5A:
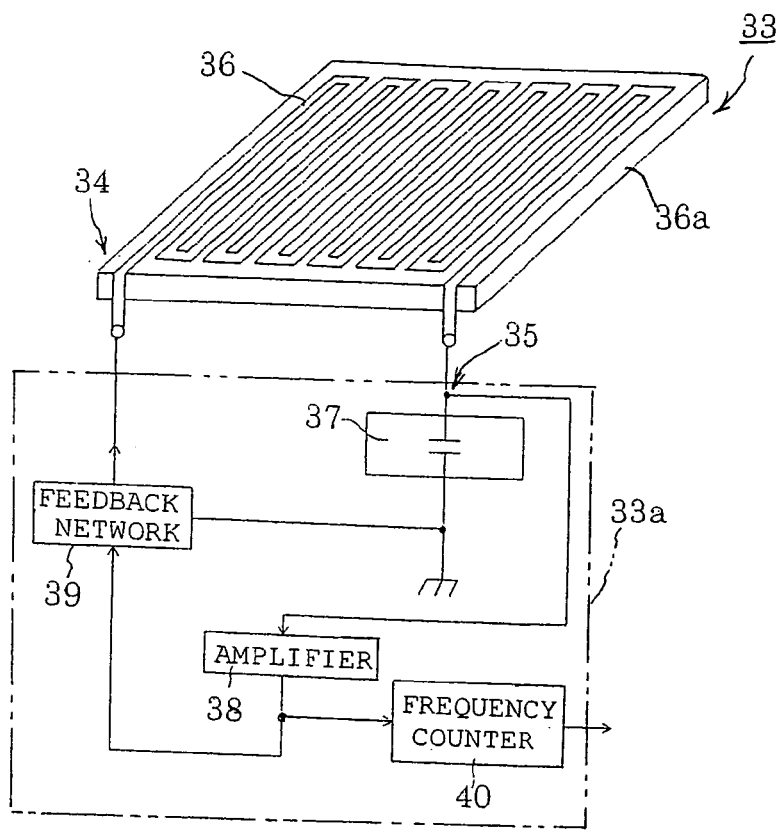
FIG. 5A is a block diagram.
Figure 5B:
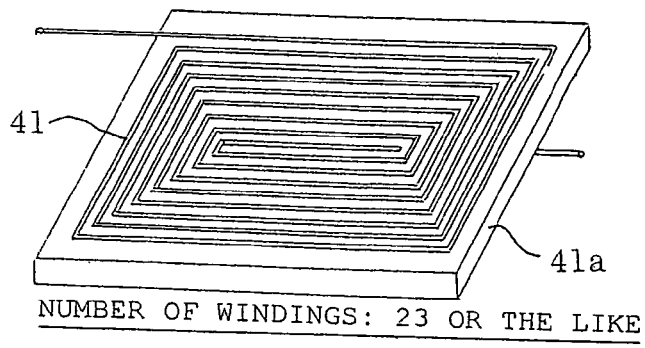
FIG. 5B is a view showing another configuration example of a planer inductor.
Figure 5C:
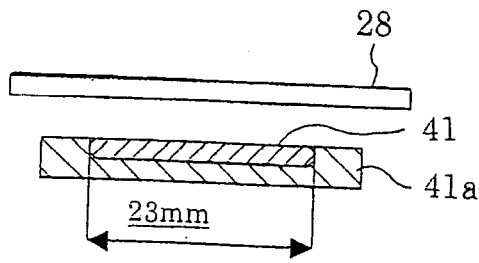
FIG. 5C is a sectional view of the planer inductor of FIG. 5B.

FIG. 5 is a view showing a configuration example of the forecasting device 33 of the polishing end point, and FIG. 5A is a block diagram, FIG. 5B is a view showing another configuration example of a planar inductor, and FIG. 5C is a sectional view of the planar inductor of FIG. 5B. An oscillation circuit 35 forming a main body of a high frequency inductor type sensor 34 in the forecasting device 33 of the polishing end point forms a LC circuit, in which a tow-dimensional planar inductor 36 serving as an inductance L is connected in series with a concentrated constant capacity 37 serving as capacitance Co. The planar inductor 36 is formed in a meander shape by using a conductive material such as Cu on a substrate 36 in a square shape and the like made of insulating material.

The planar inductor 36, in addition to the meander shape shown in FIG. 5A, may be formed by a square spiral on a square substrate 41a similarly to the planar inductor 41. Further, it may be made of an unillustrated round shaped spiral. The two-dimensional planar inductors 36 and 41 form conductive films such as Cu on substrates 36a and 41a made of insulating materials such as glass/epoxy and paper/phenol, and after that, they are fabricated by etching and the like so as to be extremely small in line width, and as shown in FIG. 5C, the total shape can be miniaturized into a square shape of approximately 23 mm on a side, a miniaturized magnetic field can be effectively generated by miniaturizing of the planar inductors 36 and 41, and without allowing the magnetic field to infiltrate deep into the conductive film 28, a changing behavior in the end point vicinity where the conducive film 28 is removed can be accurately detected.

The output signal from the LC circuit is inputted to an amplifier 38 formed of an operational amplifier and the like, and the output of the amplifier 38 is inputted to a feedback network 39 formed of resistors and the like. The output signal of the feedback network 39 is positively fed back to the planer inductor 36, thereby to form the oscillation circuit 35 including the planar inductor 36.

Figure 6A:
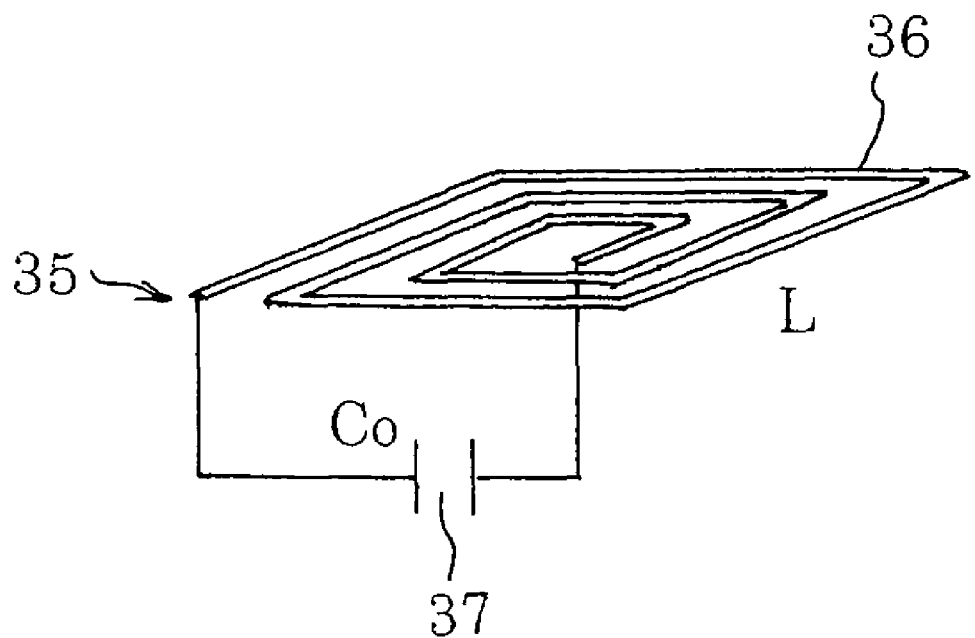
FIG. 6A is a block diagram.
Figure 6B:
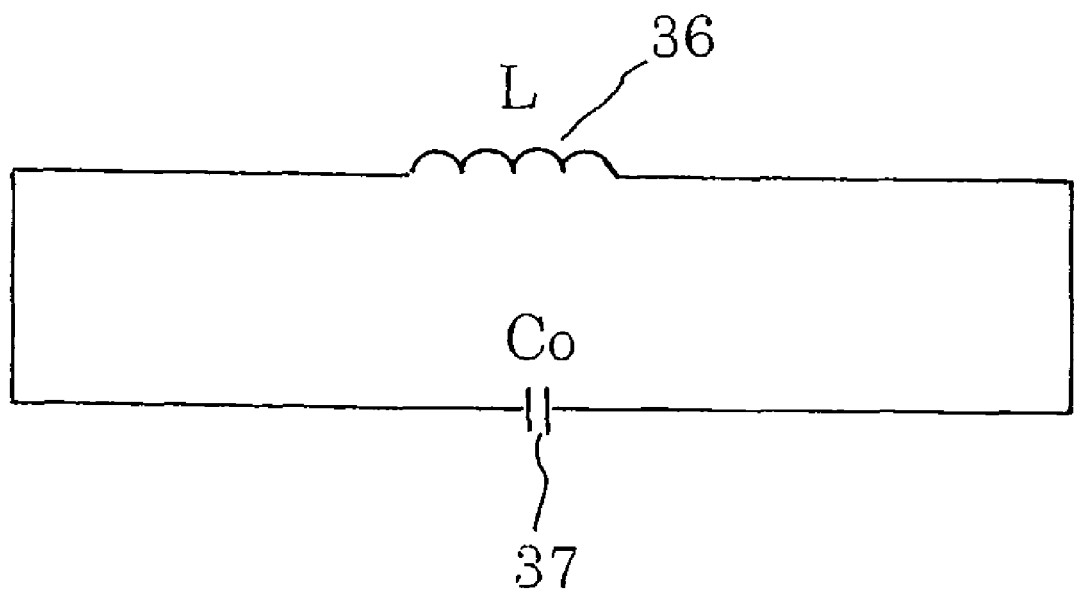
FIG. 6B is an equivalent circuit of FIG. 6A.

The oscillation circuit 35 basically, as shown in the configuration example of FIG. 6, becomes an oscillation circuit such as a Colpits type decided by inductance L of the planer inductor 36 and capacitance Co of the concentrated constant capacitor 37 with its oscillation frequency band f shown in the following formula (1).

[Formula 1]

$$f = \frac{1}{2\pi\sqrt{LC_0}} \quad (1)$$

An output terminal of the amplifier 38 is connected with a frequency counter 40. From the frequency counter 40, the detection signal and the like of the characteristic change showing a reference point to be described later are outputted to the outside in digital. By transmitting the detection signal output by digital, the effect of noise and attenuation of the output are prevented. Further, the ease of management of the film thickness data can be obtained.

The forecasting device 33 of the polishing end point is formed by including the high frequency inductor type sensor 34 including the planer inductor 36 and the frequency counter 40. By adjacently disposing the oscillation circuit 35 in the high frequency inductor type sensor 34 and the frequency counter 40 for monitoring the change of its oscillation (resonance) frequency, a distributed constant circuit is formed in the wiring connection portion between the oscillation circuit 35 and the frequency counter 40, thereby to prevent inductance and capacitance from becoming unnecessarily large and accurately detect the change of the magnetic flux accompanied with the progress of the polishing of the conductive film 28 brought into the vicinity of the high inductor type sensor 34.

The forecasting device 33 of the polishing end point is included in a package 33a with another component part or circuit implemented with an IC (Integrated circuit) except for the planar inductor 36. The planar inductor 36 is fixed on the surface of the package 33a coated with a thin insulating film. When the packaged forecasting device 33 of the polishing end point is incorporated into the chemical mechanical polishing apparatus 1, as shown in FIGS. 3 and 4, the planar inductor 36 is incorporated so as to face the inductive film 28 of the wafer W surface portion.

Further, the concentrated constant capacitor 37 configuring the oscillation circuit is variable in capacitance, and the high frequency inductor type sensor 34 can select the oscillation frequency in the range of the above described oscillation frequency band.

In the present embodiment, based on the change of the magnetic flux in a case when the predetermined conductive film 28 during the polishing becomes a film thickness corresponding to the skin depth δ of the predetermined conductive film 28, the detection of the characteristic change to be described later is performed. The skin depth δ in the predetermined conductive film 28 depends on the material of the predetermined conductive film 28 and the oscillation frequency f of the high frequency inductor type sensor 34, and is decided as the formula (2).

[Formula 2]

$$\delta = \sqrt{\frac{2}{\omega\mu\sigma}} \quad (m) \quad (2)$$

wherein ω: 2 π f, μ: permeability, σ: electrical conductivity.

The oscillation frequency f of the high frequency inductor type sensor 34 is selected so that the skin depth δ becomes smaller than the initial period film thickness of the predetermined conductive film 28 and larger than the film thickness of the predetermined conductive film 28 of an portion excluding an embedded portion in the polishing end period. When the material of the conductive film 28 of the polishing removal target is Cu, the selected oscillation frequency band is 20 MHz or more.

Here, the above described [film thickness corresponding to the skin depth] and [change of the magnetic flux generated by the skin effect] will be described with reference to FIGS. 7A to 7D. FIG. 7 is a view showing a result of the electromagnetic simulation conducted to see in which direction (arrow mark→below each figure A to D) a magnetic field the generated from the coil is set in array. This is a case where the current flowing to the coil becomes the maximum. FIG. 7A shows that an oscillation frequency from the sensor is 1MHz and a film thickness of the conductive film is 0.2 μm, FIG. 7B shows that an oscillation frequency from the sensor is 1 MHz and a film thickness of the conductive film is 1 μm, FIG. 7d shows that an oscillation frequency from the sensor is 40 MHz and a film thickness of the conductive film is 0.2 μm, and FIG. 7C shows that an oscillation frequency from the sensor is 40 MHz and a film thickness of the conductive film is 1 μm.

The setting of the electromagnetic simulation was made such that the inductor forming the magnetic field is a planar inductor having no directivity. The [film thickness corresponding to the skin depth] means a [film thickness in which a change of the magnetic flux is generated by the skin effect]. When the oscillation frequency of the sensor is 1 MHz, the magnetic flux on the conductive film present at the bottom side of the coil is vertically directed. In this frequency, even when the film thickness is 1 μm and 0.2 μm, the magnetic flux penetrates through the conductive film (FIGS. 7A and 7B). When the magnetic flux penetrates through such conductive film, as shown in the conventional example, the eddy current generated inside the conductive film decreases accompanied with the decrease of the film thickness. Hence, in the case of 1 MHz, in the film thickness of 1 μm or below, since the magnetic flux shows a monotonous behavior, no skin effect appears, and it is considered that the [film thickness corresponding to the skin depth] is at least thicker than 1 μm.

In contrast to this, when the oscillation frequency of the sensor is 40 MHz, apparently, the direction of the magnetic flux on the conductor surface is horizontal, and when the film thickness is 1 μm, the magnetic flux hardly infiltrates into the conductor (FIG. 7D). Apparently, as compared with the previous case where the oscillation frequency is 1 MHz and the film thickness is 1 μm (FIG. 7B), it is found that the direction of the magnetic flux infiltrates into the conductive film becomes different.

However, when the oscillation frequency is 40 MHz and the conductive film becomes thin up to 0.2 μm (FIG. 7C), a part of the magnetic flux only is directed inside the conductive film. This shows that, even when the conductive film is Cu, when it reaches some thin thickness, a part of the magnetic flux penetrates through the conductive film.

In the case of the magnetic flux of 40 MHz which alternatingly changes, corresponding to the skin effect, a penetrating state of the magnetic flux inside the conductive film changes. Being affected by a gradual increase of the penetrating magnetic flux, the frequency rapidly rises up to around 700 Å. However, when the film thickness is 1 μm or more, the magnetic flux hardly penetrates. Hence, in this case, presuming that the [film thickness corresponding to the skin depth] is a film thickness on a boundary line whether the magnetic flux penetrates or not, it can be said as having a thickness of approximately 1 μm. Based on this fact, when the oscillation frequency is increased to 40 MHz, and the planar inductor is used, the magnetic flux hardly infiltrates into the Cu conductive film of lam, and this is due to the skin effect.

When the Cu conductive film has an oscillation frequency of 40 MHz, assuming that the electric conductivity of Cu is 58×106 S/m, the skin depth δ becomes 9.34 μm. According to the calculation, when the film thickness is 1 μm, the magnetic flux sufficiently infiltrates into the conductive film. However, since the planar inductor is used and no directivity is available in the magnetic flux, in reality when the oscillation frequency is 40 MHz, even in case the film thickness is 1 μm, the magnetic flux does not infiltrate into the conductive film due to the skin effect. In proportion as the conductive film is becoming thinner, a part of the magnetic flux infiltrates into the conductive film, and the eddy current is slightly generated. Based on this fact, it is not that the film thickness is measured by positively using the eddy current, but that it is possible to monitor a state of the film thickness in the end point vicinity of the conductive film by using an inflection point (maximal point) of the mutual inductance induced in the conductive film by using a slightly leaking and penetrating magnetic flux due to the skin effect when the film thickness becomes a thickness in the end point vicinity.

Figure 8:
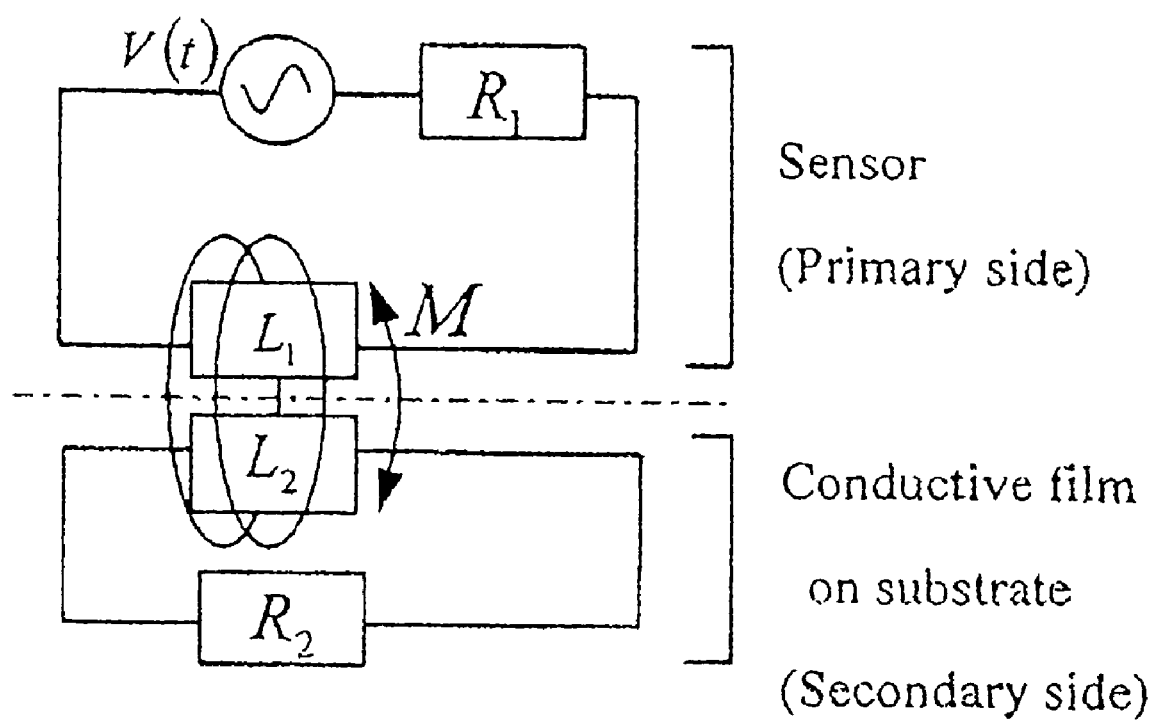
FIG. 8 is an equivalent circuit for explaining the relation between a change of the eddy current induced in the conductive film and a change of impedance of a sensor circuit system in the embodiment of the present invention.

This mutual inductance also corresponds to the impedance component of the primary side coil (coil formed of the planer inductor of the sensor circuit system). When a change of the impedance of the coil circuit system (sensor coil system) is to be determined, the relation between a change of the eddy current induced in the conductive film and a change of the impedance of the coil side is determined. When an equivalent circuit shown in FIG. 8 is formed and respective component parts are set, a circuit equation can be determined as follows.

[Formula 3]

$$L_1 \frac{di_1}{dt} + M \frac{di_2}{dt} + R_1 i_1 = v \quad (3)$$

[Formula 4]

$$L_2 \frac{di_2}{dt} + M \frac{di_1}{dt} + R_2 i_2 = 0 \quad (4)$$

Here, it is presumed that i1 and i2 are the current flowing to the primary side and the secondary side, respectively, and the primary side is applied with a voltage of v on the coil. In the case of the alternative current having a constant angular frequency ω, each are determined as follows.

[Formula 5]

$$i_1 = Re(I_1 e^{j\omega t}) \quad (5)$$

[Formula 6]

$$i_2 = Re(I_2 e^{j\omega t}) \quad (6)$$

[Formula 7]

$$v = Re(V e^{j\omega t}) \quad (7)$$

The above formulas (3) and (4) are expressed as follows.
[Formula 8]

$$\begin{bmatrix} R_1 + j\omega L & j\omega M \\ j\omega M & R_2 + j\omega L_2 \end{bmatrix} \begin{bmatrix} I_1 \\ I_2 \end{bmatrix} = \begin{bmatrix} V \\ 0 \end{bmatrix} \quad (8)$$

When this equation is solved, the following formula is obtained.

[Formula 9]

$$I_1 = \frac{R_2 + j\omega L_2}{(R_1 + j\omega L_1)(R_2 + j\omega L_2) + \omega^2 M^2} V \quad (9)$$

[Formula 10]

$$I_2 = \frac{-j\omega M}{(R_1 + j\omega L_1)(R_2 + j\omega L_2) + \omega^2 M^2} V \quad (10)$$

An impedance Z seen from the coil side becomes as follows.

[Formula 11]

$$z = \frac{V}{I_1} = R_1 + j\omega L_1 + \frac{\omega^2 M^2}{R_2 + j\omega L_2} \quad (11)$$

[Formula 12]

$$z = \left(R_1 + \frac{R_2 \omega^2 M^2}{R_2^2 + \omega^2 L_2^2}\right) + j\omega\left(L_1 - \frac{L_2 \omega^2 M^2}{R_2^2 + \omega^2 L_2^2}\right) \quad (12)$$

As a result, since a resistor $R_1$ at the coil side is considered to be almost zero, it is found that a real part of the impedance Z is proportional to the square of the mutual inductance M generated by the eddy current induced in the conductive film, and corresponds to the same. Hence, a change amount of the mutual inductance M, that is, a change of the eddy current induced in the conductive film is shown as a change of the real part of the impedance of the primary side sensor circuit system.

Figure 9:
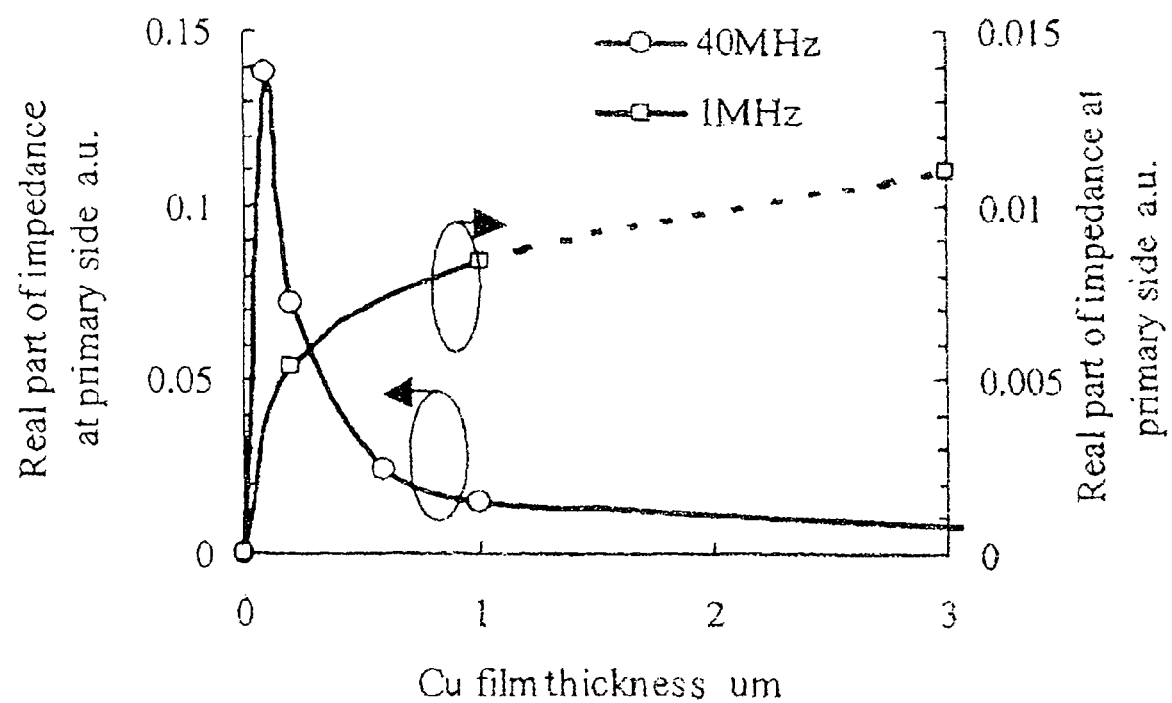
FIG. 9 is a characteristic view showing film thickness dependency of a sensor circuit system impedance real part when the planar inductor is used in the embodiment of the present invention.

In FIG. 9 shows a result obtained by a secondary electromagnetic simulation on the film thickness dependency of the real part of the impedance in a case when the planar inductor is used. In the case of 40 MHz, an inflection point is available below 1 μm, and after that, the impedance rapidly decreases. In contrast to this, it is found that, in the case of 1 MHz, depending on the film thickness, the impedance monotonously decreases. As a result, it is found that the inflection point available such as in the present application appears depending on the order of the size of the frequencies. Further, it is understood from the direction of the magnetic flux that such an appearance of the inflection point is due to the influence of the skin effect as shown in FIG. 7.

However, if the frequency is set to 40 MH and the inductor shape is made into a planar inductor, though the inflection point appears by the influence of the skin effect, it is not necessary so. As the case example, in a case when the planar inductor was placed sufficiently close to the conductive film, the same result was confirmed by a two-dimensional finite element simulation. Here, the planar inductor was brought closer than the distance shown previously by $\frac{1}{1000}$, and the distance was made 2.4 μm. The size of the coil was also made $\frac{1}{1000}$, and a radius was calculated as 11 μm. Similarly as before, when the calculation is performed with the frequency of the coil taken as 40 MHz, the conductive film taken as Cu, and the film thickness taken as 1 μm, even when the film thickness is 1 μm, different from the previous case, the magnetic flux numerously penetrates the conductive film. However, when the frequency is increased up to 1 GHz, almost all the magnetic fluxes do not penetrate the conductive film. Similarly as before, in a case when the diameter of the coil is set to $\frac{1}{1000}$ and the distance between the coil and the conductive film is set to $\frac{1}{1000}$, when the change of the real part of the impedance at the primary coil side is shown, even if the frequency is 40 MHz, it is found that the inflection point is not carried. When the frequency is increased up to 1 GHz, an inflection point is generated in the vicinity of 1 μm. From this, it is found even from the direction of the magnetic field which infiltrates into the conductive film that the inflection point is generated by the influence of the skin effect.

From the above described experimental result, to receive the influence of the skin effect and form the inflection point, it is not that the frequency is not simply increased and the planar inductor is used, but it is important also to appropriately maintain the distance between the coil (planar inductor) and the conductive film and a size of the coil. Further, those caused by the physical properties of the material such as electrical conductivity and permeability of the polishing target film are apparent from the wave form in a case when tungsten is similarly polished.

Hence, the utilization of a behavior such as observing whether or not the magnetic flux infiltrates into the conductive film by the skin effect is made possible by appropriately selecting the frequency, the shape and size of the inductor, the distance between the inductor and the conductive film, the electrical conductivity of the conductive film, and permeability. The appearance of the inflection point by the influence of such skin effect is set to appear in the vicinity of polishing end point, and an algorism for detecting the inflection point is set, thereby to newly find out a method for accurately forecasting the polishing end point. This is an essential feature of the present invention.

The portions widely different from the conventional technology in terms of the configuration can be cited as follows: (A) employment of the two-dimensional planar inductor not allowing the magnetic field to positively infiltrate into the conductive film by the skin effect in the polishing initial period and eliminating the directivity from the magnetic field instead of the inductor which shapes the magnetic field such as a ferrite core, (B) setting of the frequency to the extent of a high level to enable the skin effect to work, (C) optimization of the shape and the size of the primary side inductor and the distance between the inductor and the conductive film of the removal object in consideration of the electrical conductivity and the permeability of the conductive film, and (D) setting of the planar inductor, the frequency, and the distance between the planar inductor and the conductive film in consideration of an infiltrating critical depth of the magnetic flux based on the material of the polishing target film.

Heretofore, it was not that each element of the device was set in a state in which such influence of the skin effect appears, and the appearance of the characteristic change accompanied with the inflection point based on such skin effect was intentionally formed, and based on that formation, the polishing end point was forecasted. Further, heretofore, no method was shown in which, by skillfully using the presence of that peak, and with that peak portion taken as a reference position, the polishing end point was forecasted. Further, as an unconventional remarkable effect, by obtaining the characteristic change accompanied with the inflection point such as whether the magnet field as a consumption portion of the eddy current is consumed in the conductive film or not, but leaks into the element, and is put into a state in which it is not consumed in the conductive film, it is possible to clearly understand the situation regarding the infiltration of the magnetic field. However, in the conventional method, it is considered as a significant difference that the situation regarding the infiltration of the magnetic field into the element is not known, and no consideration is given to the damages to the element by the energy of the magnetic field. The present invention is based on the hard ware and its detection algorism formed based on the difference of such an apparently different operation effect.

Figure 10:
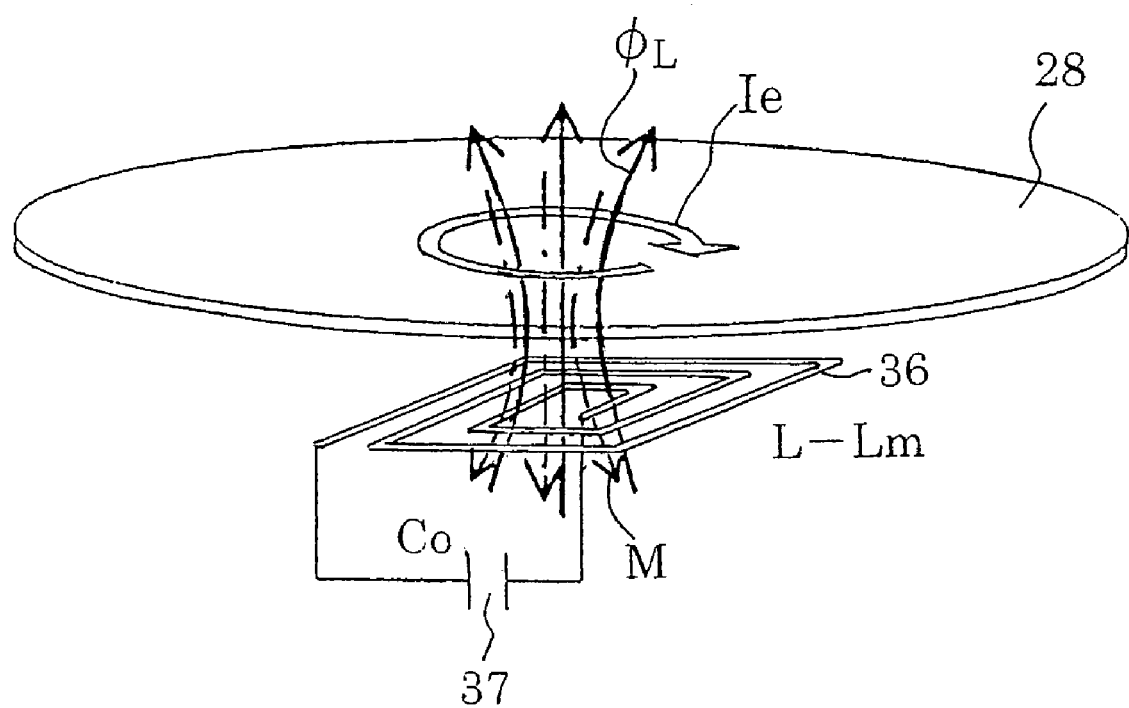
FIG. 10 is a configuration diagram for explaining a change action of inductance by the magnetic field generated by electromagnetic coupling in a high frequency inductor type sensor according to the embodiment of the present invention.

Next, the polishing operation of a chemical mechanical polishing apparatus incorporated with the forecasting device of the polishing end point formed as described above and a method for forecasting the polishing end point will be described by using FIG. 10, FIGS. 11A to 11E, and FIGS. 12A to 12E as a comparative example of FIG. 11. FIG. 10 is a view for explaining the change action of inductance by the magnetic field generated by electromagnetic coupling in a high frequency inductor type sensor, FIG. 11 is a view for explaining change examples of the magnetic flux and the eddy current accompanied with polishing elimination of the conductive film and the detection action of a film thickness reference point, and FIGS. 11A to 11D are views showing the change examples of the magnetic flux and the eddy current accompanied with the polishing elimination of the conductive film, and FIG. 11E is a characteristic view showing a change example of the resonance frequency for a film thickness change of the conductive film. In FIGS. 11A to 11D, a planar inductor 36 is shown in a spiral form to make it easy to see the figure.

First, a conductive film 28 put on standby at a predetermined place by an unillustrated migratory mechanism mounts a polishing head 3 in the chemical polishing apparatus 1 on a wafer W. A vacuum line 24 of the polishing head 3 is operated, and an air chamber 29 of the bottom surface of the elastic sheet 11 is vacuumized through a vacuum port 19a and a hole 22 (vacuum hole), and as a result, the conductive film 28 absorbs and holds a non-polished wafer W, and by the migratory mechanism, the conductive film 28 transports the polished head 3 absorbing and holding a non-polished wafer W onto a platen 2, and the conductive film 28 mounts the wafer W on the platen 2 to face and contact the polishing pad 6.

The vacuum line 24, when the polishing operation of the conductive film 28 on the wafer upper portion is completed, absorbs and holds the wafer W by the polishing head 3 again by the operation of the vacuum line 24, and is used when the wafer W is transmitted to an unillustrated cleaning device.

Next, the operation of the vacuum line 24 is released, and from an unillustrated pump, the air is fed to an air bag 25, and the air bag 25 is inflated. At the same time, the air is fed to an air chamber 29 from an air outlet 19 provided in a carrier 8. As a result, the inner pressure of the air chamber 29 becomes high.

By the inflation of the air bag 25, the conductive film 28 of the wafer W upper portion and a retainer ring 9 are pressed to a polishing pad 6 by a predetermined pressure. In this state, a platen 2 is rotated in the direction of an arrow A of FIG. 1, and at the same time, the polishing head 3 is rotated in the direction of an arrow mark B of FIG. 1, and on the rotating polishing pad 6, a slurry is fed from an unillustrated nozzle, thereby to polish the predetermined conductive film 28 on the wafer W upper portion.

As described below, a change of the film thickness of the predetermined conductive film 28 accompanied by the polishing is monitored by the magnetic flux formed by a planar inductor 36 in a high frequency inductor type sensor 34, and a characteristic change 42 serving a reference point is detected.

The planar inductor 36 is driven by a high frequency oscillated from an oscillation circuit 35, and a magnetic flux φ varied time-serially corresponding to a cycle of the high frequency from the planer inductor 36 is generated. In the polishing initial period, the magnetic flux φ induced in the predetermined conductive film 28 passes through a region of the skin depth δ only approximately in parallel along the film surface, and the infiltration of the magnetic flux φ into a region exceeding the skin depth δ in the predetermined conductive film 28 is avoided (FIG. 11A). Further, the resonance frequency oscillated from the high frequency inductor type sensor 34 is held constant regardless of the change of the film thickness of the predetermined conductive film 28 (FIG. 1E).

When the polishing progresses and the predetermined conductive film 28 becomes equal to the skin depth δ or the film thickness in its vicinity, a part of the magnetic flux φ penetrates the predetermined conductive film 28 and begins to generate a leakage magnetic flux $\phi_L$. The magnetic flux φ which does not penetrate the predetermined conductive film 28 passes through as it is approximately in parallel along the film surface. In proportion to the number of leakage magnetic fluxes $\phi_L$ having penetrated the predetermined conductive film 28, the eddy current Ie is generated (FIG. 11B).

When the polishing further progresses, the leakage magnetic fluxes $\phi_L$ begins to increase, and the eddy current Ie is generated in a wide region along the film surface of the conductive film 28 (FIG. 11C). This eddy current Ie generated in this wide region, as shown in FIG. 10, further creates a magnetic field M, and this magnetic field M operates to negate the magnetic flux $\phi_L$ generated from the original planar inductor 36. As a result, by the magnetic field M formed by the conductive film 28, the mutual inductance Lm is increased, and an apparent inductance L of the original planar inductor 36 is reduced. As a result, the oscillation frequency f oscillated from the high frequency inductor type sensor 34 increases as shown by the following formula (13).

[Formula 13]

$$f = \frac{1}{2\pi\sqrt{(L-Lm)C_O}} \tag{13}$$

Consequently, by the generation of the mutual inductance, the inductance of the sensor circuit system equivalently decreases, and the resonance frequency oscillated from the high frequency inductor type sensor 34 increases (regions b and c of FIG. 11E).

By further progress of the polishing, the leakage magnetic flux $\phi_L$ increases, and is saturated. However, the eddy current Ie rapidly decreases accompanied with the decrease of the film thickness volume of the predetermined conductive film 28 (FIG. 11D). By the rapid decrease of this eddy current Ie, the mutual inductance also rapidly decreases. This rapid decrease of the mutual inductance leads to a lowering of the decreased portion Lm of the inductance in the formula (13), and as a result, the inductance of the sensor circuit system equivalently increases, and the resonance frequency oscillated from the high frequency inductor type sensor 34 rapidly decreases (region d of FIG. 11E).

In this manner, after the predetermined conductive film 28 becomes equal to the skin depth δ or the film thickness in its vicinity by the progress of the polishing, the eddy current Ie is generated and increases, and by the subsequent rapid decrease thereof, the inductance of the sensor circuit system decreases once, and after that, turns to an increase. By this behavior, the waveform of the resonance frequency oscillated from the high frequency inductor type sensor 34 is generated with the characteristic change 42 having an inflection point (peak) P accompanied with a steep rise and a steep fall. Based on this characteristic change 42 accompanied with the inflection point (peak) P generated before the polishing end point, the polishing end point is forecasted.

The forecasting of the polishing end point can be accurately performed not only in the case where the inflection point (peak) P in the characteristic change 42 is used, but also in the case where at least either of a rise starting point, percentage of the rise and an amount of the rise or an amount of change from the rise to the fall is used. When the predetermined conductive film 28 is Cu, the remaining film amount at a time when the inflection point P in the characteristic change 42 is detected is approximately 1000 Å, and a finish-polishing is performed for the remaining film amount, thereby to complete the polishing.

As the finish-polishing, for example, the film thickness corresponding to the skin depth which is the remaining film amount in the inflection point P is polished for a polishing time portion set in advance by a required polishing rate from an inflection point in the characteristic change 42, and after that, the polishing is taken as completed. Alternatively, the film thickness corresponding to the skin depth which is the remaining film amount in the inflection point P in the characteristic change 42 is divided by the polishing rate, thereby to calculate a required polishing time after the detection of the inflection point P, and after the detection of the inflection point P, the polishing is performed by the calculated polishing time portion, thereby to complete the polishing.

Next, the comparison examples of FIG. 12A to 12E will be described. In these comparison examples, the frequency is applied such that the skin depth δ becomes larger than the initial film thickness of the conductive film 28. By being applied with such a frequency, during the monitoring of the change of the film thickness from the polishing initial period to the polishing end period, the magnetic flux φ induced in the conductive film 28 fully penetrates the conductive film 28 and generates the leakage magnetic flux IL. Therefore, during the monitoring of the change of the film thickness, the eddy current Ie that is proportional to the leakage magnetic flux $\phi_L$ (FIG. 12A to FIG. 12D). Hence, by this eddy current Ie between the conductive film 28 and the planar inductor, a large mutual inductance is generated, and by a decreased portion Lm of the inductance by this mutual inductance, the oscillation frequency f oscillated from the sensor becomes as the formula (13) from the polishing initial period.

In proportion as the film thickness decreases by the progress of the polishing, the eddy current Ie rapidly decreases (FIG. 12B to 12D), and accompanied with this, the mutual inductance decreases, and the decreased portion Lm of the inductance in the formula (13) also decreases. As a result, the inductance of the sensor circuit system equivalently increases and the resonance frequency oscillated from the sensor monotonously decreases (FIG. 12E).

In this manner, in the comparison examples, since the resonance frequency draws a monotonously decreasing curve, it is possible to estimate a film thickness decreased amount from the polishing initial period, but it is not possible to exactly discriminate the polishing end point or a state before the polishing end point. For example, when a floating capacitance C is changed by a delicate setting, an overall resonance frequency of FIG. 12E is shifted up and down across the whole waveform. Hence, assuming that the setting is made such that when the resonance frequency becomes a frequency of some setting, it is taken as the polishing end point, when the resonance frequency is shifted overall, a threshold value is unable to be set. Further, even when a state of the removed amount from the initial film thickness is monitored in real time by the change of the eddy current, in case the initial film thickness is fluctuated, the film thickness in a state in which the polishing end point is reached is also fluctuated. Since there is no characteristic of the waveform available, in this case also, similarly to the above described, no threshold value can be set.

Figures 13A, 13B, 13C:
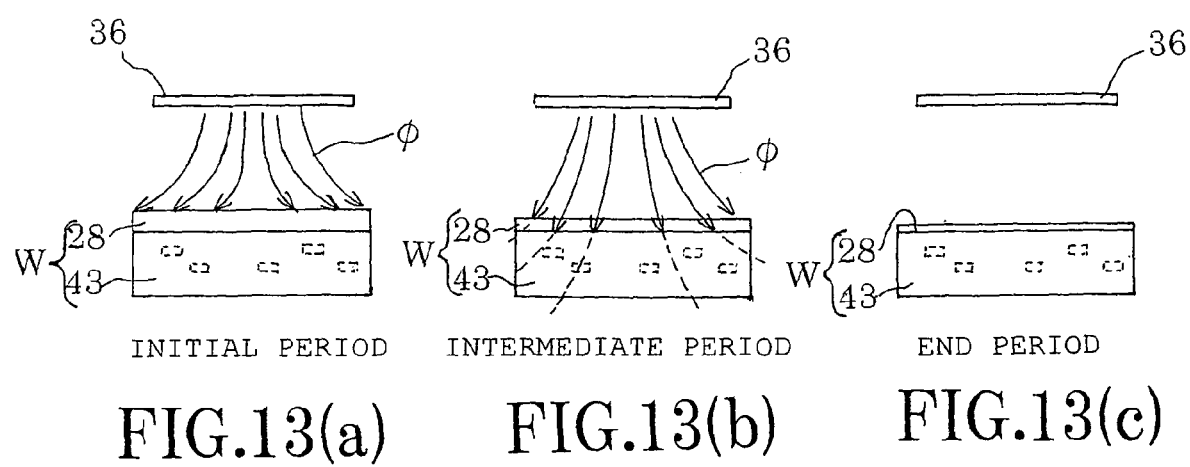
FIG. 13A is a view in the polishing initial period.
FIG. 13B is a view in the polishing intermediate period.
FIG. 13C is a view in the polishing end period.
Figures 14A, 14B, 14C:
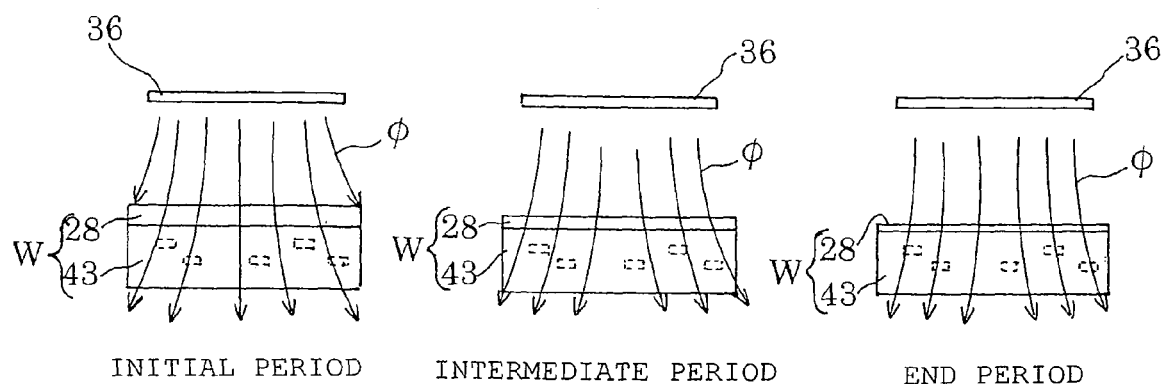
FIG. 14A is a view in the polishing initial period.
FIG. 14B is a view in the polishing intermediate period.
FIG. 14C is a view in the polishing end period.
Figure 15A:
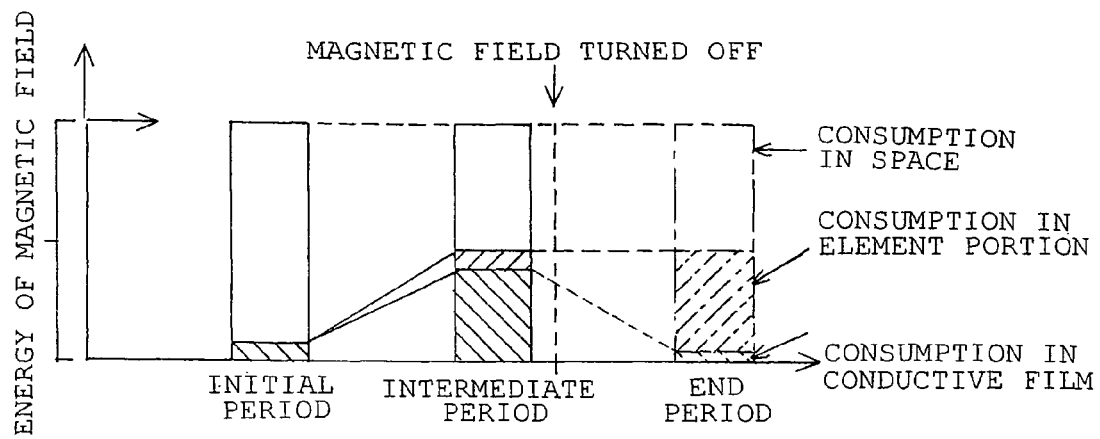
FIG. 15A is a view of the case of the present embodiment.
Figure 15B:
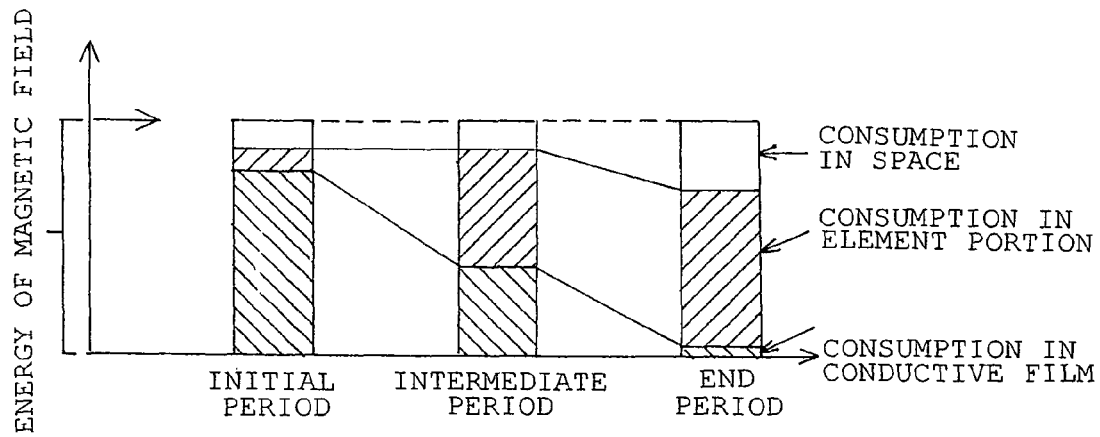
FIG. 15B is a view of the case of the conventional example as a comparison example of FIG. 15A.

Next, the energy consumption of the magnetic filed by the change of the magnetic flux accompanied with the above described change of the film thickness will be described by using FIGS. 13 to 15. FIG. 13 is a view showing the change of the magnetic flux corresponding to the energy consumption of the magnetic field in the present embodiment. FIG. 13A is a view of the polishing initial period, FIG. 13B is a view of the polishing intermediate period, FIG. 13C is a view of the polishing end period. FIG. 14 is a view as a comparison example of FIG. 13, and FIG. 14A is a view of the polishing initial period, FIG. 14B is a view of the polishing intermediate period, and FIG. 14C is a view of the polishing end period, respectively. FIG. 15 is a view for explaining the energy consumption of the magnetic field, and FIG. 15A is for the case of the present embodiment, and FIG. 15B is for the case of the conventional example.

The energy consumption of the magnetic filed in the present embodiment will be described. In the polishing initial period, by the skin effect, the magnetic flux φ hardly infiltrates into the conductive film 28 of the surface portion, but it is bounced back. Hence, an amount of the energy of the magnetic field consumed inside the conductive film 28 is infinitesimal, and the most of the energy of the magnetic field is discharged into the space, and is consumed in the space (initial period of FIG. 13A and FIG. 15A In the polishing intermediate period, the penetrating magnetic flux begins to increase, and the eddy current formed in the conductive film 28 of the surface portion increases corresponding to the increasing penetrating magnetic flux, and the most of the energy of the magnetic field is turned into the eddy current loss (Joule heat loss), and is consumed. Hence, though some magnetic field infiltrates into the element portion 43, the majority is consumed by the conductive film 28, and therefore, the energy of the magnetic filed exerted over the element portion 43 is protected by the conductive film 28 of the surface portion, and is alleviated in a large degree (intermediate period of FIG. 13B and FIG. 15A).

In the polishing end period, in proportion as the film thickness decreases by the progress of the polishing, the magnetic field further penetrates through the conductive film 28, thereby to increase the eddy current. By further decrease of the film thickness, the volume of the conductive film thickness itself generating the eddy current decreases, and therefore, the eddy current rapidly turns to a decrease. By this behavior of the eddy current, the characteristic change 42 (see FIG. 11) accompanied with the inflection point P is generated in the magnetic flux φ induced in the conductive film 28. In a process in which the eddy current in this characteristic change 42 decreases, the magnetic flux φ induced in the conductive film 28 is alleviated or turned off. As a result, the infiltration of the magnetic field into the element portion 43 accompanied with the decrease of the film thickness is prevented (end period of FIG. 13C and FIG. 15A)

By detecting the characteristic change 42 accompanied with the inflection point P, the polishing end point can be accurately forecasted. From a point when the characteristic change 42 accompanied with the inflection point P is detected, there is no more need to throw the magnetic field into the conductive film 28. This is because at a point when the characteristic change 42 accompanied with the inflection point P immediately before the polishing end point is accurately monitored, it is possible to accurately estimate the polishing end point almost on time. Hence, at a point when this characteristic change 42 is detected, by alleviating or turning off the magnetic flux φ induced in the conductive film 28, it is possible to suppress the formation of the eddy current or forecast the polishing end point without giving damages to the element, the minute wiring, and the like in the element portion 43.

For example, when the polishing rate is around 5000 Å/min, and the initial period film thickness is 7000 Å, and its approximately 7000 Å is required to be polished and removed, assuming that a reference polishing rate is 5000 Å/min, the polishing processing time requires 1.41 min. During that time, if the film passes through the inflection point P serving as the reference point (remaining 710 Å point) after 75.5 sec, the film is polished almost in 5000 Å/min, and there is no problem caused. Hence, it needs only to polish the remaining 710 Å in 8.5 sec, and the polishing is completed by 84 sec in total. However, for example, after the polishing is started, if the film is presumed to have arrived at the inflection point P (remaining 710 Å point) in 68.6 sec, it is found that the polishing rate is approximately (7000-710)/(68.6/60) and by the polishing rate of approximately 5500 Å/min, the polishing is performed. Hence, considering that, for the remaining 710 Å also, the polishing progresses with the polishing rate at 5500 Å/min, the polishing may be performed by 710 (Å)/5500(Å/min) in 7.7 sec.

The energy consumption of the magnetic field in the comparison example for the present embodiment will be described. In the polishing initial period, since the magnetic field has directivity, almost all the magnetic fluxes φ penetrate the conductive film of the surface portion, and almost all the energy of the magnetic field are consumed inside the conductive film (initial period of FIG. 14A and FIG. 15B).

In the polishing intermediate period, the film thickness of the conductive film of the surface portion decreases, and while the film thickness decreases, the eddy current formed corresponding to the decreased film thickness amount decreases. Although the Joule heat generated inside the conductive film decreases by the decreased portion of the eddy current amount, the energy of the magnetic field of this period is kept directed to the element portion 43 which is present below the conductive film. That is, the energy portion of the magnetic filed not consumed as the eddy current loss (Joule heat loss) by the conductive film is directed to the element portion 43 as it is, and is consumed by a portion in which the conductive film inside the element portion 43 is present (intermediate period of FIG. 14B and FIG. 15B).

In the polishing end period, by the decrease of the film thickness, the most of the magnetic filed infiltrates into the element portion 43, and further, a part of the magnetic fields penetrates the element portion 43. Hence, the energy of the magnetic field, though partly consumed in the space, the most of the energy is consumed inside the element portion 43 (end period of FIG. 14C and FIG. 15B).

Figure 16B:
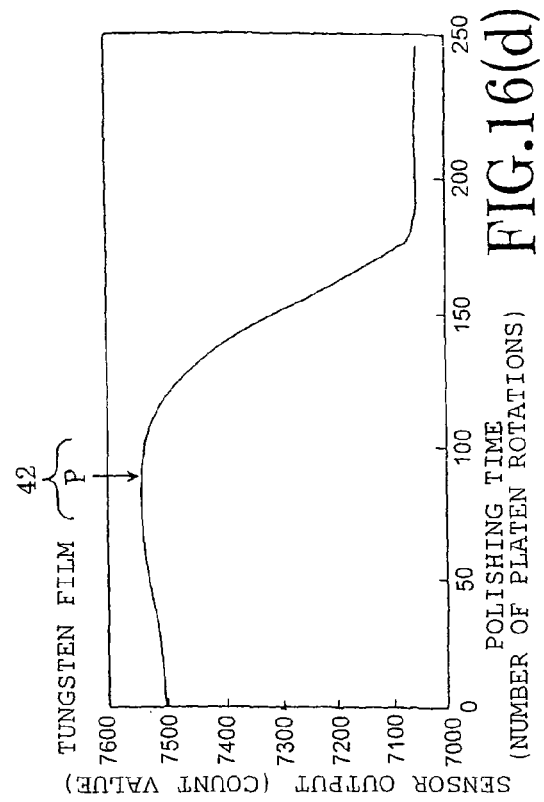
FIG. 16 views showing a result of estimating a peak serving as a film thickness reference point for a Cu film and a tungsten (W) film in which the conductive film as the polishing target is different in material and electrical conductivity in the embodiment of the present invention.
Figure 16D:
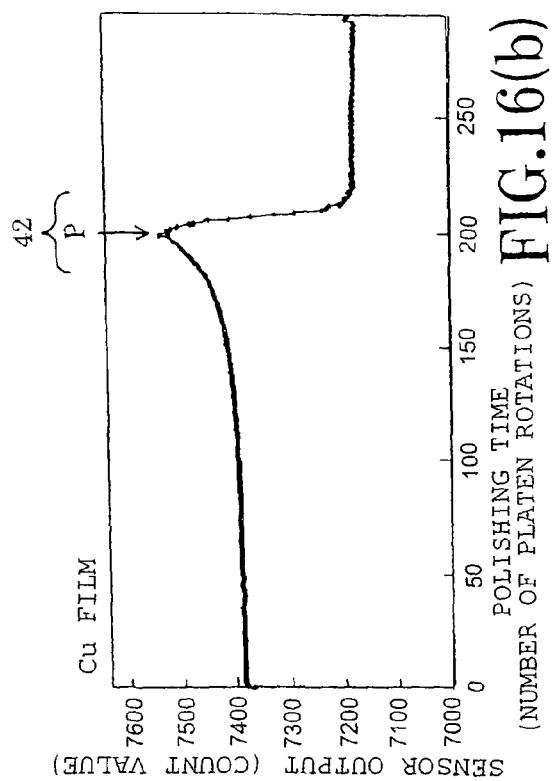
Figure 16A:
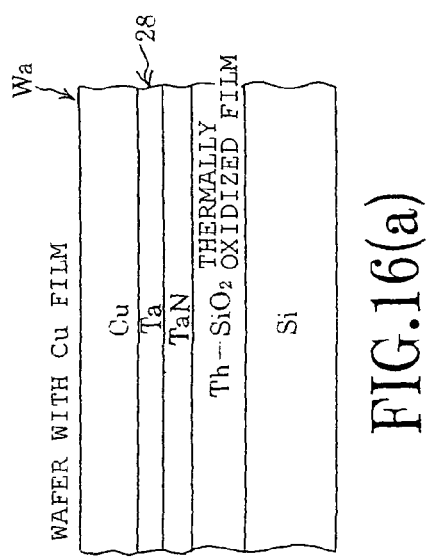
Figure 16C:
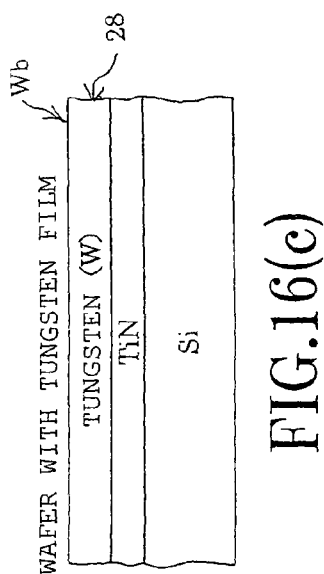

FIGS. 16A to 16D show a result of evaluating the characteristic change 42 accompanied with an inflection point (peak) P serving as a reference point for two kinds of wafers Wa and Wb in which the conductive film serving as a polishing target is different in material and electrical conductivity. FIG. 16A is a view showing the wafer Wa with Cu film, FIG. 16B is a view showing a change characteristic of the resonance frequency for the film thickness of the Cu film, FIG. 16C is a view showing the wafer Wb with tungsten (W) film, and FIG. 16D is a view showing a change characteristic of the resonance frequency for the film thickness of the tungsten (W) film. The sensor output of each ordinate axis in FIGS. 16B and 16D corresponds to the resonance frequency.

Any of the Cu film and the tungsten (W) film has the resonance frequency once increased together with the progress of the polishing, and after that, the resonance frequency rapidly decreases, and the characteristic change 42 accompanied with the inflection point (peak) P is generated. This behavior, as compared with the case of the tungsten (W) film shown in FIG. 16C, is apparently remarkable in the case of Cu film which has a large electrical conductively shown in FIG. 16B.

Figure 17A:
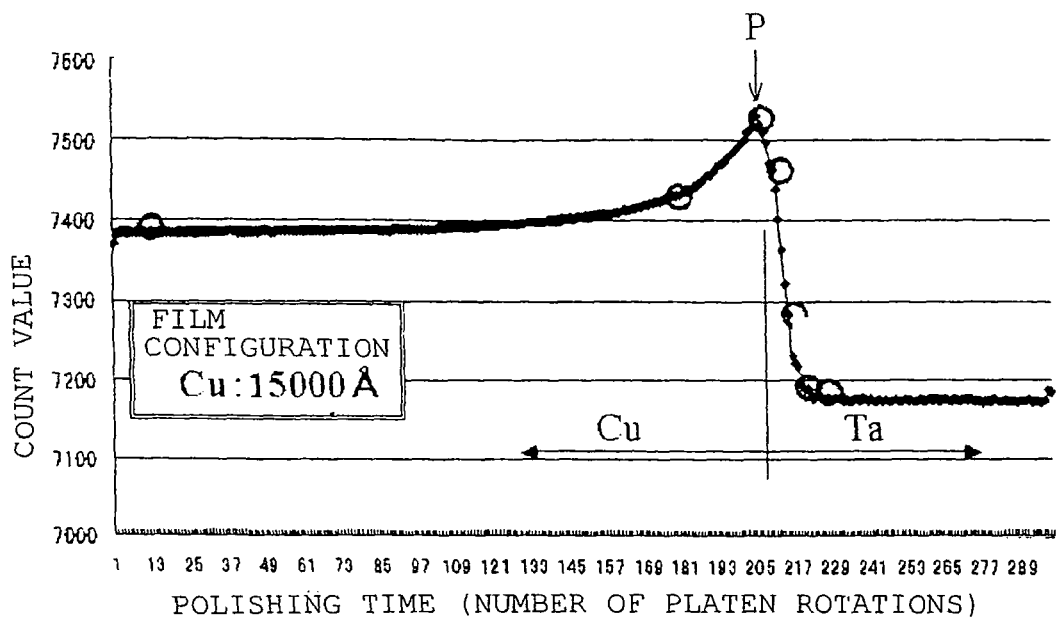
FIG. 17A is a view showing a relation example between the film thickness accompanied with the progress of the polishing and the resonance frequency.
Figure 17B:
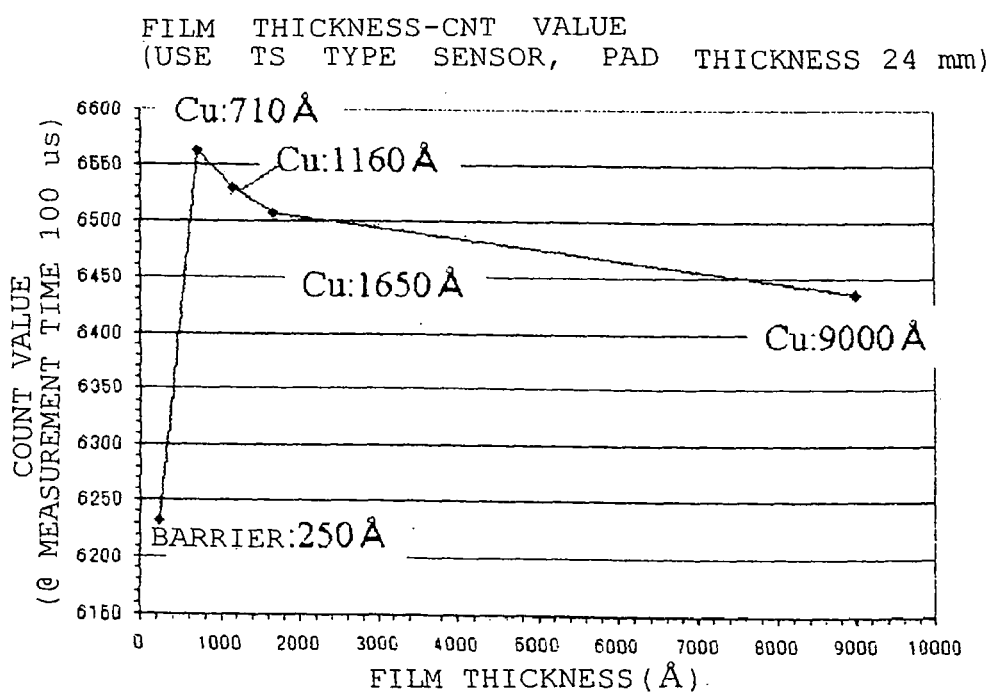
FIG. 17B is a view a relation example between the film thickness and the resonance frequency in a resting state.

FIGS. 17A and 17B are views showing the relation between the film thickness and the resonance frequency in a case when the conductive film as the polishing target is the Cu film, and FIG. 17A is a view showing the relation between the film thickness accompanied with the progress of the polishing and the resonance frequency, and FIG. 17B is a view showing the relation between the film thickness in a resting state and the resonance frequency. The count value of each ordinate in FIGS. 17A and 17B corresponds to the resonance frequency.

In FIG. 17A, the initial period film thickness of the Cu film is approximately 1.5 μm (15000 Å). The Cu film has the resonance frequency gradually increased accompanied with the progress of the film thickness from the vicinity of 1 μm, and has the maximum value at the vicinity of 700 Å, so that the characteristic change 42 accompanied with the inflection point (peak) P is detected. The resonance frequency, after having the maximum value, rapidly decreases. In this manner, the Cu film has the remaining film thickness accurately detected in a case when the inflection point (peak) P in the characteristic change 42 is detected.

In FIG. 17B, the resonance frequency measured for each film thickness of the Cu film in a resting state shows the maximum value with the film thickness at 710 Å. Consequently, the film thickness of the Cu film in which the resonance frequency becomes the maximum in a resting state, and the film thickness of the Cu film in which the resonance frequency becomes the maximum during the progress of the polishing are approximately identical to each other.

The present embodiment can detect the film thickness reference point P based on at least any of the changes from among the changes of the mutual inductance, the eddy current Ie, and the leakage magnetic flux φ$_L$, the inductance change of the sensor circuit system in the high frequency inductance type sensor 34 by the mutual inductance or the impedance change in addition to the resonance frequency. The change of the mutual inductance can be determined from the change of the oscillation frequency of the high frequency inductor type sensor 34 by using the formula (3), and since the eddy current Ie is in a proportional relation with the mutual inductance, the change of the eddy current can be determined by using the change of the mutual inductance, and further, since the eddy current φ$_L$ is in a proportional relation with the eddy current Ie, the change of the eddy current φ$_L$ can be determined by using the change of the eddy current Ie.

As described above, in the method and device for forecasting the polishing end point, from the characteristic change 42 accompanied with the inflection point P before the completion of the polishing, the polishing end point can be accurately forecast and detected.

After the detection of the characteristic change 42 accompanied with the inflection point P, by alleviating or turning off the magnetic flux induced in the predetermined conductive film 28, it is possible to prevent a strong magnetic flux from being exerted over the element, the minute wiring, and the like on the device wafer downward the conductive film.

By using at least any of change of the eddy current Ie after the predetermined conductive film 28 has become equal to the skin depth δ or the film thickness in its vicinity, the mutual inductance, the inductance or the impedance of the sensor circuit system, or the resonance frequency oscillated by the inductor type sensor 34, the generation of the characteristic change 42 of the magnetic flux before the polishing end point can be easily and clearly detected.

By optimizing at least any of the frequency given to the planar inductor 36, the inductor shape or the distance between the planar inductor 33 and the predetermined conductor film 28, the directivity of the magnetic field for the conductive film 28 can be appropriately set. Consequently, during the removal start to the removal end of the predetermined conductive film 28, a process of the increase and the decrease of the eddy current by the skin effect is generated, so that the characteristic change 42 of the magnetic flux immediately before the polishing end point can be generated.

The present invention can be variously modified unless the spirit of the present invention is deviated, and it is only natural that the present invention extends over the modifications thus carried out.

DESCRIPTION OF REFERENCE NUMERALS

1 CHEMICAL MECHANICAL POLISHING APPARATUS
2 PLATEN
3 POLISHING HEAD
4 ROTATION AXIS
5 MOTOR
6 POLISHING PAD
7 HEAD MAIN BODY
8 CARRIER
9 RETAINER RING
10 RETAINER RING PRESSING MEANS
11 ELASTIC SHEET
12 ROTATION AXIS
13 DRY PLATE
14 PIN
15 OPERATION TRANSFORMER
16 CARRIER PRESSING MEANS
17 AIR FLOAT LINE
19 AIR OUTLET
20 AIR FILTER
21 INTAKE PUMP
22 HOLE
23 VACUUM PUMP
24 VACUUM LINE
25 AIR BAG
27 RETAINER RING HOLDER
28 CONDUCTIVE FILM
29 AIR CHAMBER
30 FITTING MEMBER
31 SNAP RING
32 FLIP RING
33 FORECASTING DEVICE OF POLISHING END POINT
34 HIGH FREQUENCY INDUCTOR TYPE SENSOR
35 OSCILLATION CIRCUIT
36 PLANAR INDUCTOR
37 CONCENTRATED CONSTANT CAPACITOR
38 AMPLIFIER
39 FEEDBACK NETWORK
40 FREQUENCY COUNTER
41 PLANAR INDUCTOR
42 CHARACTERISTIC CHANGE
43 ELEMENT PORTION
P INFLECTION POINT GENERATED DURING CHARACTERISTIC CHANGE
W WAFER

What is claimed is:

1. A method for forecasting a polishing end point for forecasting and detecting a polishing end point in a case when a conductive film is polished and a predetermined conductive film is appropriately removed,
wherein an inductor in an inductor type sensor is placed adjacent to the predetermined conductor film, and by the magnetic flux formed by the inductor, a change of magnetic flux induced in the predetermined conductive film is monitored, and based on the skin effect decided with the material of the predetermined conductive film during the polishing as a factor, and accompanied with the decrease of the film thickness by a progress of the polishing, the magnetic flux penetrating the predetermined conductive film increases, so that a process in which a formed eddy current increases is included, and based on the characteristic change of the magnetic flux induced in the predetermined conductive film by the eddy current, the polishing end point is forecasted.

2. A method for forecasting a polishing end point for forecasting and detecting a polishing end point in a case when a conductive film is polished and a predetermined conductive film is appropriately removed,
wherein an inductor in an inductor type sensor is placed adjacent to the predetermined conductor film, and by the magnetic flux formed by the inductor, a change of magnetic flux induced in the predetermined conductive film is monitored, and based on the skin effect decided with the material of the predetermined conductive film during the polishing as a factor, and accompanied with the decrease of the film thickness by a progress of the polishing, the magnetic flux penetrating the predetermined conductive film increases, so that a process in which a formed eddy current increases is included, and based on the characteristic change of the magnetic flux induced in the predetermined conductive film by the eddy current, the polishing end point is forecasted, and at the same time, the magnetic flux induced in the predetermined conductive film is alleviated or turned off.

3. The method for forecasting the polishing end point according to claim 1 or 2, wherein the inductor placed adjacent to the predetermined conductive film is a two-dimensional planer inductor.

4. The method for forecasting the polishing end point according to claim 1 or 2, wherein the magnetic flux induced in the predetermined conductive film is alleviated or turned off by decreasing or turning off the current fed to the inductor.

5. The method for forecasting the polishing end point according to claim 1 or 2, wherein the monitoring of a change of the magnetic flux induced based on the skin effect of the predetermined conductive film is at least any one of the measurement of the eddy current in the predetermined conductive film, the measurement of a mutual inductance generated by the occurrence of the eddy current by the predetermined conductive film, the measurement of a change of inductance or a change of impedance of the sensor circuit system in the inductor type sensor by the mutual inductance of the predetermined conductive film or the measurement by a change of resonance frequency when a change of inductance of the sensor circuit system is oscillated by connecting the inductor and capacity in parallel.

6. The method for forecasting the polishing end point according to claim 1 or 2, wherein with respect to the method for forecasting the polishing end point from the characteristic change of the magnetic flux, a film thickness amount corresponding to the characteristic change of the magnetic flux is set, and after the polishing time portion set in advance from the film thickness amount is polished, the polishing is taken as completed.

7. The method for forecasting the polishing end point according to claim 1 or 2, wherein with respect to the method for forecasting the polishing end point from the characteristic change of the magnetic flux, a film thickness amount corresponding to the characteristic change of the magnetic flux is set, and the remaining polishing time required from the film thickness amount to the polishing end point is calculated, and after the time portion calculated from a point of the film thickness amount corresponding to the characteristic change of the magnetic flux is polished, the polishing is taken as completed.

8. A forecasting device of a polishing end point in a polishing apparatus for allowing the predetermined conductive film of a wafer surface to slidingly contact with a polishing pad and performing a polishing work, comprising a high frequency inductor type sensor provided with an oscillator circuit configuring a sensor circuit system made of a planer inductor and a capacitor opposite to the predetermined conductive film at the polishing time, wherein, from the planar inductor, the predetermined conductive film is given a magnetic field, and by that magnetic field, a reversed magnetic field generated in the predetermined conductive film is detected, thereby to forecast the polishing end point, and wherein, during the period from a removal start to the removal end of the predetermined conductive film, accompanied with the decrease of the film thickness by the progress of the polishing, at least any of a frequency and an inductor shape given to the planar inductor or a distance between the planar inductor and conductive film is optimized so that there exist a process in which an eddy current generated in the predetermined conductive film increases by the introduced magnetic field and a process in which accompanied with the decrease of the film thickness when the polishing is progressed as it is, the eddy current generated in the predetermined conductive film decreases by the introduced magnetic field.

* * * * *